(12) United States Patent
Saito et al.

(10) Patent No.: US 7,039,775 B2
(45) Date of Patent: May 2, 2006

(54) NON-VOLATILE STORAGE DEVICE AND REWRITE CONTROL METHOD THEREOF

(75) Inventors: Kenji Saito, Tokyo (JP); Teiichiro Nishizaka, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 217 days.

(21) Appl. No.: 10/164,657

(22) Filed: Jun. 6, 2002

(65) Prior Publication Data

US 2002/0188814 A1    Dec. 12, 2002

(30) Foreign Application Priority Data

Jun. 8, 2001    (JP)    ............................. 2001-174517

(51) Int. Cl.
*G06F 12/00*    (2006.01)
(52) U.S. Cl. ....................................... 711/159; 711/202
(58) Field of Classification Search ................ 711/103, 711/159, 156, 202, 102; 345/556
See application file for complete search history.

(56) References Cited

U.S. PATENT DOCUMENTS

| | | | | |
|---|---|---|---|---|
| 5,485,595 A * | 1/1996 | Assar et al. | ................ | 711/103 |
| 5,983,312 A * | 11/1999 | Komatsu et al. | ............ | 711/103 |
| 6,401,160 B1 * | 6/2002 | See et al. | ...................... | 711/5 |
| 6,427,186 B1 * | 7/2002 | Lin et al. | ..................... | 711/103 |
| 6,625,715 B1 * | 9/2003 | Mathews | .................... | 711/207 |
| 6,772,274 B1 * | 8/2004 | Estakhri | ..................... | 711/103 |

FOREIGN PATENT DOCUMENTS

JP        09-081332        3/1997

OTHER PUBLICATIONS

English Bibliography and Abstract of JP 09-081332 (cited above).

* cited by examiner

*Primary Examiner*—Pierre M. Vital
(74) *Attorney, Agent, or Firm*—Darryl G. Walker; Bradley T. Sako

(57) ABSTRACT

A non-volatile storage device (1), such as a flash memory, that may include a plurality of sectors and additional sectors has been disclosed. Sectors may include a physical sector number. A logical sector number may be assigned to a sector with additional sectors not assigned a logical sector number. When an erase/write command is executed for a logical sector address, an additional sector may be selected to have the new or updated data written into and may be assigned the logical sector number. The additional sector assigned the logical sector number may then have the new or updated data written into while the physical sector number previously assigned the logical address is being erased. In this way, an apparent erase time may be reduced. The newly erased sector may be a new additional sector. Each sector may include a control data section (101) and a data section (102). Control data section (101) may store control data for controlling erasing and rewriting.

24 Claims, 13 Drawing Sheets

| PHYSICAL SECTOR NO. | LOGICAL SECTOR NO. | | | | | | | | |
|---|---|---|---|---|---|---|---|---|---|
| | ERASE/WRITE 1 → | 2 → | 3 → | 4 → | 5 → | 6 → | 7 → | 8 | |
| 0 | 0 | 0 | 0 | 0 | 0 | 0 | 0 | 0 | |
| 1 | 1 | 1 | 1 | 1 | 1 | 1 | 1 | 1 | |
| 2 | 2 | 2 | 2 | 2 | 2 | 2 ↑Erase Add 3 | | Add 2 | |
| 3 | 3 | 3 ↑Erase Add 4 | | Add 3 | | Add 1 ↑ | Prog 2 ↑ Erase Add 3 | | |
| 4 | 4 | 4 | 4 | 4 | 4 | 4 | 4 | 4 | |
| 5 | 5 | 5 | 5 | 5 | 5 | 5 | 5 | 5 | |
| 6 | 6 | 6 | 6 | 6 | 6 | 6 | 6 | 6 | |
| 7 | 7 | 7 | 7 | 7 | 7 | 7 | 7 | 7 | |
| 8 | 8 | 8 | 8 | 8 | 8 | 8 | 8 | 8 | |
| 9 | 9 | 9 | 9 | 9 | 9 | 9 | 9 | 9 | |
| 10 | 10 | 10 | 10 | 10 | 10 | 10 | 10 | 10 | |
| 11 | 11 | 11 | 11 | 11 | 11 | 11 | 11 | 11 | |
| 12 | 12 | 12 | 12 | 12 | 12 | 12 | 12 | 12 | |
| 57 | 57 | 57 | 57 | 57 | 57 | 57 | 57 | 57 | |
| 58 | 58 | 58 | 58 | 58 | 58 | 58 | 58 | 58 | |
| 59 | 59 | 59 | 59 | 59 | 59 | 59 | 59 | 59 | |
| 60 | 60 | 60 | 60 | 60 | 60 | 60 | 60 | 60 | |
| 61 | 61 | 61 | 61 | 61 | 61 ↑Erase Add 4 | 61 | 61 | 61 | |
| 62 | 62 | 62 | 62 | 62 ↑Erase Add 4 | Add 1 ↑ | Add 3 | Add 2 | 63 | |
| 63 | 63 ↑Erase Add 4 | Add 1 ↑ | 63 ↑Erase Add 3 | Prog 63 | Add 3 | Prog 63 ↑ | 63 | Add 1 ↑ | Prog 2 |
| Add 0 (64) | Add 1 ↑ | Prog 63 | Prog 3 | Add 1 ↑ | 63 ↑ | Erase NG | USE PROHIBITED THEREAFTER | | |
| Add 1 (65) | Add 2 | Add 1 | Add 2 | Prog 62 | | | | | |
| Add 2 (66) | Add 3 | Add 2 | | 3 | 3 | 3 | 3 | 3 | |
| Add 3 (67) | Add 4 | Add 3 | | 62 | 62 | 62 | 62 | 62 | |

FIG. 5

| PHYSICAL SECTOR NO. | LOGICAL SECTOR NO. | | | | | | | | |
|---|---|---|---|---|---|---|---|---|---|
| | ERASE/WRITE | 1 | 2 | 3 | 4 | 5 | 6 | 7 | 8 |
| 0 | | 0 | 0 | 0 | 0 | 0 | 0 | 0 | 0 |
| 1 | | 1 | 1 | 1 | 1 | 1 | 1 | 1 | 1 |
| 2 | | 2 | 2 | 2 | 2 | 2 | 2 | 2→ Erase Prog 2 | → Erase Prog 2 |
| 3 | | 3 | 3 →Erase Prog 3 | | 3 | 3 | 3 | 3 | 3 |
| 4 | | 4 | 4 | 4 | 4 | 4 | 4 | 4 | 4 |
| 5 | | 5 | 5 | 5 | 5 | 5 | 5 | 5 | 5 |
| 6 | | 6 | 6 | 6 | 6 | 6 | 6 | 6 | 6 |
| 7 | | 7 | 7 | 7 | 7 | 7 | 7 | 7 | 7 |
| 8 | | 8 | 8 | 8 | 8 | 8 | 8 | 8 | 8 |
| 9 | | 9 | 9 | 9 | 9 | 9 | 9 | 9 | 9 |
| 10 | | 10 | 10 | 10 | 10 | 10 | 10 | 10 | 10 |
| 11 | | 11 | 11 | 11 | 11 | 11 | 11 | 11 | 11 |
| 12 | | 12 | 12 | 12 | 12 | 12 | 12 | 12 | 12 |
| 57 | | 57 | 57 | 57 | 57 | 57 | 57 | 57 | 57 |
| 58 | | 58 | 58 | 58 | 58 | 58 | 58 | 58 | 58 |
| 59 | | 59 | 59 | 59 | 59 | 59 | 59 | 59 | 59 |
| 60 | | 60 | 60 | 60 | 60 | 60 | 60 | 60 | 60 |
| 61 | | 61 | 61 | 61 | 61 | 61 | 61 | 61 | 61 |
| 62 | | 62 | 62 | 62 | 62→Erase Prog 63 | 61→Erase Prog 62 | 62 →Erase Prog 63 | 62 | 62 |
| 63 | | 63→Erase Prog 63 | 62→Erase Prog 63 | 63→Erase Prog 63 | | | | 63 | 63 |

FIG. 11 (BACKGROUND ART)

NON-VOLATILE STORAGE DEVICE AND REWRITE CONTROL METHOD THEREOF

TECHNICAL FIELD

The present invention relates generally to a non-volatile storage device, and more particularly to a non-volatile storage device that may be capable of being erased and rewritten in blocks according to sector units and a control method for the same.

BACKGROUND OF THE INVENTION

Due to the development of electrically erasable and programmable non-volatile storage devices (electrically erasable and programmable read only memory—EEPROM), EEPROMs, such as flash EEPROMs can be used as alternative storage devices, replacements for magnetic storage medium, or the like. Flash EEPROMs are EEPROMs that are arranged in blocks of memory cells that are simultaneously erased.

Referring now to FIG. 10(a), a floor plan of a conventional flash memory chip layout is set forth in a top plan view. In order to utilize the characteristics of non-volatility, the memory is used by repeating erase and write cycles. In order to reduce chip size and for compatibility with a hard disk system or the like, erasing is performed on a unit that includes a plurality of memory cells. The unit of memory cells erased in a block is called a sector.

The conventional flash memory chip 1000 shown in the example of FIG. 10(a) includes 64 sectors (S00–S63), a logic section 11, and a charge pump capacitor 12. Charge pump capacitor 12 serves as a booster circuit and supplies a high electric voltage (Vpp) for writing, for example. Logic section 11 includes an erase and verify circuit for erasing in sector units, a write circuit for controlling writing to a memory cell, a read circuit for controlling reading from a memory cell, and a power supply control circuit, for example.

In an erasing operation, all bits in memory cells (memory cell transistors having floating gates) that are in the same sector are erased simultaneously. The erasing operation requires sufficient time to extract electrons from the floating gates through FN (Fowler-Nordheim) tunneling, for example, plus the time for erase verification or other such steps to provide uniform erasing characteristics. Thus, compared to a reading operation, an erasing operation requires a greater amount of time.

Further, in a case where all sectors (S00–S63) are being used, when one of the sectors (S00 to S63) is erased and then rewritten, the erasing procedure and then the writing procedure will be performed in a sequential order.

FIG. 11 is a table showing an erase/write procedure. In FIG. 11, physical sector numbers (0–63) are shown in the vertical direction and logical sector address and erase/write changes are shown along the horizontal direction. In this example, the physical sector number (also referred to as a "physical sector address", indicating the address of the sector unit in a physical sector space), and the logical sector number (also referred to as a "logical sector address", corresponding to a logical address for accessing the sector from a host system), correspond to each other in a one-to-one fashion. In FIG. 11, in the case where the sector at logical sector number 63 (physical sector number 63 in this case) is to be rewritten, the sector at physical sector number 63 is erased and re-writing (indicated as Prog in FIG. 11, i.e. programming) is performed.

Subsequently, the sector at a logical sector number 3 (therefore, physical sector number 3) is erased and rewriting (Prog) is performed.

At erase/write 3 and 5, the sector at physical sector number 63 is erased and rewriting (Prog) is performed again.

At erase/write 6 and 7, the sector at a physical sector 2 is erased and rewriting (Prog) is performed in succession.

The amount of time required per sector for the erase routine is approximately 1 second (preprogram+erase+rewriting). In the case where every bit in the sector is to be written, the writing also requires approximately 0.5 seconds. Therefore, including the erase routine, 1.5 seconds or more are required to rewrite a sector.

Further, the writing and erasing steps of a flash memory usually uses a F-N (Fowler-Nordheim) tunneling or a CHE (channel hot electron) injection method. In a writing step, for example, a high voltage is applied to the control gate and drain of a floating gate type memory cell while the source is grounded. In this way, hot electrons generated in the vicinity of the drain are injected into the floating gate. In the erasing step, for example, F-N tunneling or the like is used to pull electrons from the floating gate to the source, drain, etc. Thus, erasing and writing are performed through a silicon oxide film (gate insulating film or tunnel oxide film) of the floating gate memory cell transistor by adding and removing electrons to and from the floating gate. These steps of writing and erasing the flash memory causes damage to the silicon oxide film. Therefore, the number of times the write/erase rewriting steps can be performed is limited on the order of 100,000 to 1,000,000 times.

In the case where data in the conventional flash memory is to be rewritten, the sector including the memory cells in which data is rewritten is erased. After erasing, the same sector is written with new data.

As shown in FIG. 11, erasing and writing (Prog) is performed in a sequential fashion in order to rewrite data in a sector. Thus, for the data rewriting, an amount of time defined as [erase time for 1 sector]+[writing time] is necessarily required.

In other words, in a conventional flash memory, writing of new data can be performed only after physically erasing data in sector units (corresponding to sector units in which new data is being written). Therefore, the erase time+writing time are needed. The amount of time required for this is much greater than the time required for reading data from a memory cell. As described above, the time required for rewriting is considered to be on the order of 1.5 seconds or longer. As shown in FIG. 11, in the case where the erasing of the physical sector number 2 is repeated consecutively (erase/write 6 and 7), access to the conventional flash memory is forced to wait for a duration of time equivalent to the time required for consecutive rewriting operations, for example.

In a case where the number and frequency of erasing/writing times at one sector gets concentrated than at another sector, the lifetime of the flash memory can be shortened. That is, in the case where a number of erase/write repetition times to the same sector exceeds the limit, the flash memory becomes unusable. When the frequency of rewriting is concentrated more in one sector than in another, the time period that the sector can be used is shortened. Further, as the flash memory is being used for a variety of purposes, the demand to increase the number of write/erase repetition times and achieve a longer lifetime is growing.

Japanese Patent Application Laid Open No. Hei 9-81332 (JPA '332) discloses a conventional flash disk card that can effectively use a flash memory for a longer period of time.

Referring now to FIG. 13, a diagram of the configuration of a conventional flash disk card as disclosed in JPA '332 is set forth. Conventional flash disk card includes a flash memory 400 composed of M sectors, or M sectors and r redundant sectors and a logical/physical address conversion table 91. Logical/physical address conversion table 91 outputs a physical sector number 1 through N, or 1 through N and M+1 through M+r, in response to input of a logical sector number 1 through N, which is less than M. Conventional disk card of JPA '332 also includes a means for erasing data at a physical sector number defined by table 91, writing data to be updated into an unused sector or a sector where data is already erased, and changing the physical sector number which the table 91 outputs in response to the logical number L to the number of the sector that the data to be updated was written into when the data in a logical sector number L that is equal to or less than N is to be updated. Conventional disk card of JPA '332 also includes reading means for reading out the physical sector number determined by the table in a case where the inputted logical sector number L is less than N, and reading out the data at a physical sector number L in a case where the number L is greater than N. Each sector has an area into which is written information indicating whether there is a problem or not (problem/normal). A RAM 900 stores and manages a defective sector replacement table 92. When there is a problem in a sector and the physical address and logical address are not converted, the sector is replaced with the redundant sector.

In FIG. 13, a 512-byte sector data area 500 stores the data of the sector (512 bytes), which is the data accessing unit in the hard disk system. A 16-byte sector management data area 501 stores the logical sector number (LSN) of that sector, ECC (error correction codes) data of the data in that sector, and data of flag information indicating the validity of that sector, for example. Memory space of the flash memory 400 is composed of a first area 503, a second area 504, and a third area 505. The first area 503 is an area composed of sectors which are frequently rewritten by a host system (not shown in FIG. 13). The first area 503 is composed of sectors having physical sector numbers 1 through N. The physical sector number to be accessed by the host system is determined based on the logical physical address conversion table 91 stored in the RAM 900. The second area 504 is an area for storing file data. The second area 504 is composed of sectors at the physical sector number N+1 though M. The physical sector number, which the host system accesses, is the same as the logical sector number. The third area 505 is a redundancy area and composed of sectors at physical sector numbers M+1 through M+r. In the case where a defect is generated in the sector having the logical sector number L, the management area of that sector is written with data indicating invalidity, and one of the r redundant sectors is written with data. Also, the redundant sector that the data was written into as logical sector number L is stored in the defective sector replacement table 92. However, in the conventional flash card disk of JPA '332, the address conversion table for converting the logical sector number to the physical sector number is provided in a RAM. As a result, in the case where a power break occurs, the address conversion information in the address conversion table is lost. JPA '332 lacks an awareness of the problem of how to improve sector erase speed.

In view of the above discussion, it would be desirable to provide a non-volatile storage device and a control method for the same in which apparent rewriting time may be significantly reduced in a non-volatile storage device having a flash memory or a flash memory chip. It would also be desirable to provide a non-volatile storage device and a control method for the same in which frequency of usage may be balanced among sectors. It would also be desirable to provide a non-volatile storage device which may have an increased lifetime.

SUMMARY OF THE INVENTION

According to the present embodiments, a non-volatile storage device, such as a flash memory, may include a plurality of sectors and additional sectors. Sectors may include a physical sector number. A logical sector number may be assigned to a sector. Additional sectors may not be assigned a logical sector number. When an erase/write command is executed for a logical sector address, an additional sector may be selected to have the new or updated data written into and may be assigned the logical sector number. The additional sector assigned the logical sector number may then have the new or updated data written into while the physical sector number previously assigned the logical address is being erased. In this way, an apparent erase time may be reduced. The newly erased sector may be a new additional sector. Each sector may include a control data section and a data section. The control data section may store data for controlling erasing and writing.

According to one aspect of the embodiments, a non-volatile storage device may include a plurality of sectors. The plurality of sectors may be divided into logical sectors and at least one additional sector. Each sector may be erasable as a unit. When data stored in a first one of the logical sectors is updated, the updated data may be written into a first one of the at least one additional sector and the first one of the logical sectors may be erased. The first one of the at least one additional sector may become the first one of the logical sectors and the first one of the logical sectors that is erased may become one of the at least one additional sector.

According to another aspect of the embodiments, each sector may be identified with an individual physical sector address. Each logical sector may be identified with an individual logical sector address. The updated data may be written into the first one of the at least one additional sector while the first one of the logical sectors is being erased.

According to another aspect of the embodiments, the non-volatile storage device may include an address conversion section. The address conversion section may provide the individual physical sector address in response to receiving the individual logical sector address.

According to another aspect of the embodiments, each sector may include a data storing section and a control data storing section. The logical sector address for each logical sector may be stored in the control data storing section. An address conversion section may include a random access memory storing an address conversion table.

According to another aspect of the embodiments, the non-volatile storage device may include a control section. The control section may read the logical sector address in the control data storage section of each logical sector in response to a power up initialization.

According to another aspect of the embodiments, the non-volatile storage device may include a plurality of additional sectors. Each additional sector may be associated with an erase value. The erase value may indicate a number of times the additional sector has been erased. The first one of additional sectors may be selected according to the erase value having a lowest value among the additional sectors.

According to another aspect of the embodiments, an erase value for each sector may be stored in the control data storing section of the sector.

According to another aspect of the embodiments, each sector may be associated with a usability flag indicating whether or not the sector is usable.

According to another aspect of the embodiments, each sector may include a data storing section and a control data storing section. The non-volatile storage device may include a control section, writing into the control data storing section of the first one of the at least one additional sector, an individual logic sector address and a physical sector address of the first one of the logical sectors being erased.

According to another aspect of the embodiments, a non-volatile storage device may include a flash memory. The flash memory may include a plurality of sectors divided into logical sectors and at least one additional sector. Each sector may be associated with an individual physical sector address. Each logical sector may be identifiable as a logical sector by being assigned an individual logical sector address. Each sector may include a data storage section and a control data storage section. The control section of each logical sector may store the assigned individual logical sector address. When data stored in the lgical sector identified with a first individual logical address is updated, the updated data may be written into a first one of the at least one additional sector and the logical sector identified with the first individual logical address may be erased. The first one of the at least one additional sector may become identified with the first individual logical address and the logical sector that is erased becomes one of the at least one additional sector.

According to another aspect of the embodiments, the control data storage section of each logical sector may store the individual physical address of the sector that was previously assigned to the individual logical sector address currently assigned to the logical sector.

According to another aspect of the embodiments, the control data storage section of each logical sector may store a first erase value. The first erase value may indicate the number of erasures of the sector having the individual physical address that was previously assigned to the individual logical sector address currently assigned to the logical sector. The control data storage section of each logical sector may also store a first erase flag. The first erase flag may indicate whether the sector having the individual physical address that was previously assigned to the individual logical sector address currently assigned to the logical sector has been erased.

According to another aspect of the embodiments, the control data storage section of each sector may store a second erase value indicating the number of erasures of the sector itself.

According to another aspect of the embodiments, the control data storage section of each sector may store a usability flag. The usability flag may indicate the usability of the sector itself.

According to another aspect of the embodiments, the control data storage section of each sector may store a second erase flag indicating whether or not the sector itself has been erased.

According to another aspect of the embodiments, the non-volatile storage device may include an address conversion section. The address conversion section may provide the individual physical sector address in response to receiving the individual logical sector address.

According to another aspect of the embodiments, a non-volatile storage device may include a plurality of sectors divided into logical sectors and at least one additional sector. Each sector may be erasable as a unit and may be associated with an individual physical sector address. Each logical sector may be identifiable as a logical sector by being assigned an individual logical sector address. Each sector may include a data storing section and a control data storing section. A rewrite control method for the non-volatile storage device may include the steps of erasing the sector assigned to a first logical sector address when data in the sector assigned to the first logical sector address is to be updated, writing the updated data into a first one of the at least one additional sector while the sector assigned to the first logical sector address is being erased, assigning the first logical sector address to the first one of the at least one additional sector to convert the first one of the tat least one additional sector to one of the plurality of logical sectors, and managing the erased sector as a new additional sector.

According to another aspect of the embodiments, the non-volatile storage device may include a plurality of additional sectors. Writing the updated data may include selecting the first one of the plurality of additional sectors based on a least number of erase times.

According to another aspect of the embodiments, the control data storage section of each logical sector may include the assigned individual logical sector address, the individual physical sector address of the sector previously assigned the individual logical sector address, an erase flag indicating whether or not the erasure of the sector previously assigned the individual logical sector address has been completed, and an erase values indicating the number of times the sector previously assigned the individual logical sector address has been erased.

According to another aspect of the embodiments, the control data storage section of each sector may include an erase flag indicating whether or not the erasure of the sector has been completed and an erase value indicating the number of times the sector has been erased.

According to another aspect of the embodiments, a rewrite control method may include the steps of address conversion to provide the individual physical sector address in response to receiving the individual logical sector address and updating an address conversion table to assign the first logical sector address to the first one of the at least one additional sector.

According to another aspect of the embodiments, a random access memory may store the address conversion table. A control section may update the address conversion table in response to a power up initialization.

According to another aspect of the embodiments, a rewrite control method may include the step of setting a usability flag of the sector assigned to the first logical sector address to unusable if erasing the sector assigned to the first logical sector address fails.

According to another aspect of the embodiments, writing the updated data into the first one of the at least one additional sector may include writing the first logical sector address into the control data storage section of the first one of the at least one additional sector and writing the physical sector address of the sector being erased that is assigned to the first logical sector address into the control data storage section of the first one of the at least one additional sector.

According to another aspect of the embodiments, writing the updated data into the first one of the at least one additional sector may include writing an erase value indicating how many times the sector assigned to the first logical sector address and being erased has been erased into the control data storage section of the first one of the at least one additional sector.

According to another aspect of the embodiments, a rewrite control method may include the step of updating an erase value in the control data storage section of the erased sector to indicate the number of times the erased sector has been erased.

According to another aspect of the embodiments, the rewrite control method may include the step of setting an erase flag in the control data storage section of the erased sector to indicate erased.

BRIEF DESCRIPTION OF THE DRAWINGS

FIG. 5 is a diagram illustrating various activities performed on and logical sector number mapped to physical sector numbers according to an embodiment.

FIG. 11 is a table showing an erase/write procedure.

DETAILED DESCRIPTION OF THE EMBODIMENTS

Various embodiments of the present invention will now be described in detail with reference to a number of drawings.

Figure 10:
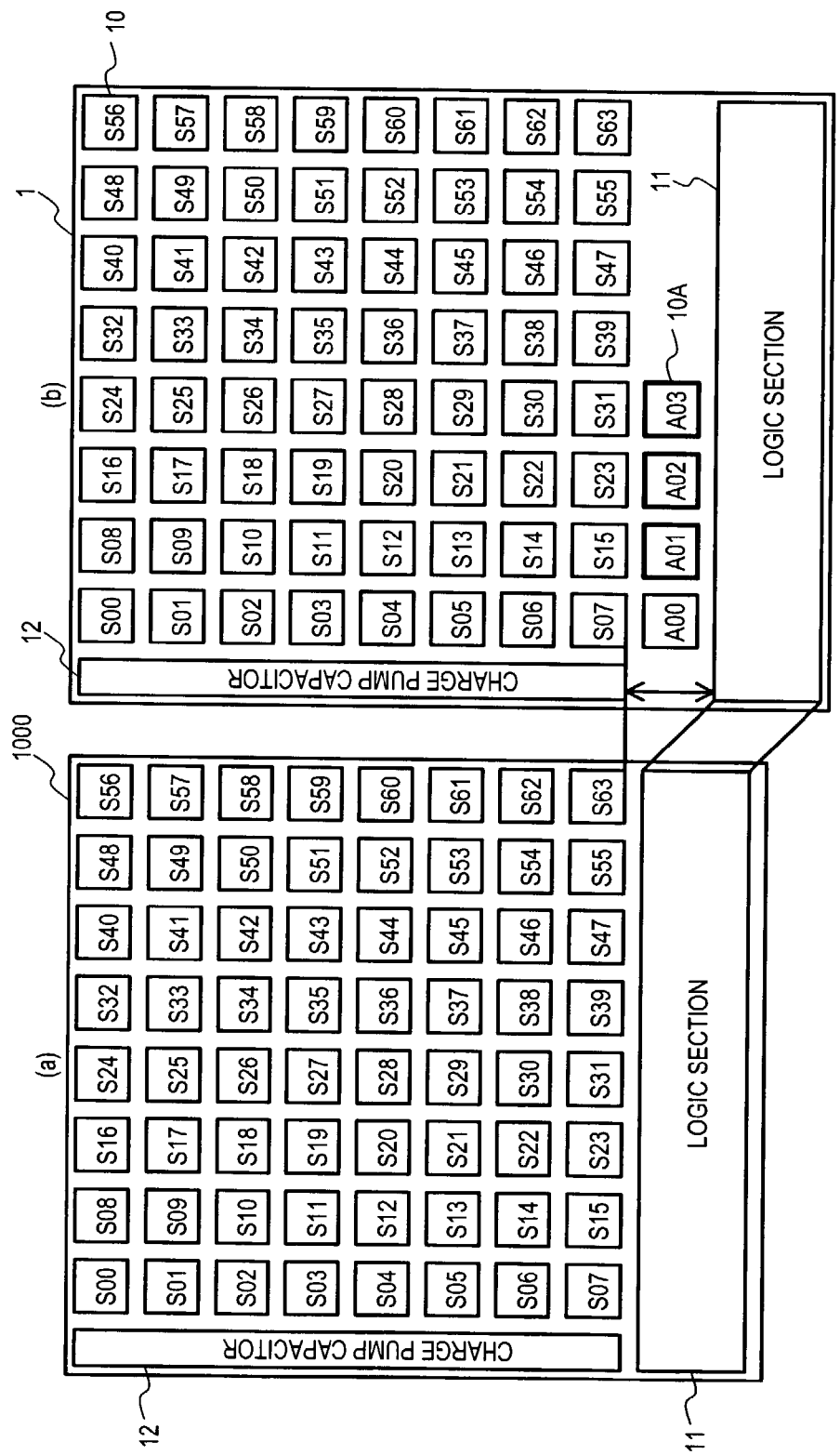
FIG. 10(a) is a floor plan of a conventional flash memory chip layout.
FIG. 10(b) is a floor plan of a non-volatile storage device layout according to an embodiment.

Referring now to FIG. 10(b), a floor plan of a non-volatile storage device layout according to an embodiment is set forth. The non-volatile storage device 1 of FIG. 10(b) may include a flash memory. A Flash memory may include M sectors 10 and 10A. Sectors 10 may be specified by a logical address (a logical address defined by sector units may also be referred to as a "logical sector address" and may correspond to a "logical sector number"). There may be N sectors 10. The remaining M-N sectors may serve as additional sectors 10A. Non-volatile storage device 1 may also include a charge pump capacitor 12 and a logic section 11. Charge pump capacitor 12 may include a booster circuit for generating a high voltage Vpp at a time of writing or erasing, for example. Logic section 11 may include a circuit performing various controls for operations such as erasing, writing, reading, and power supply control, as just a few examples.

Figure 7:
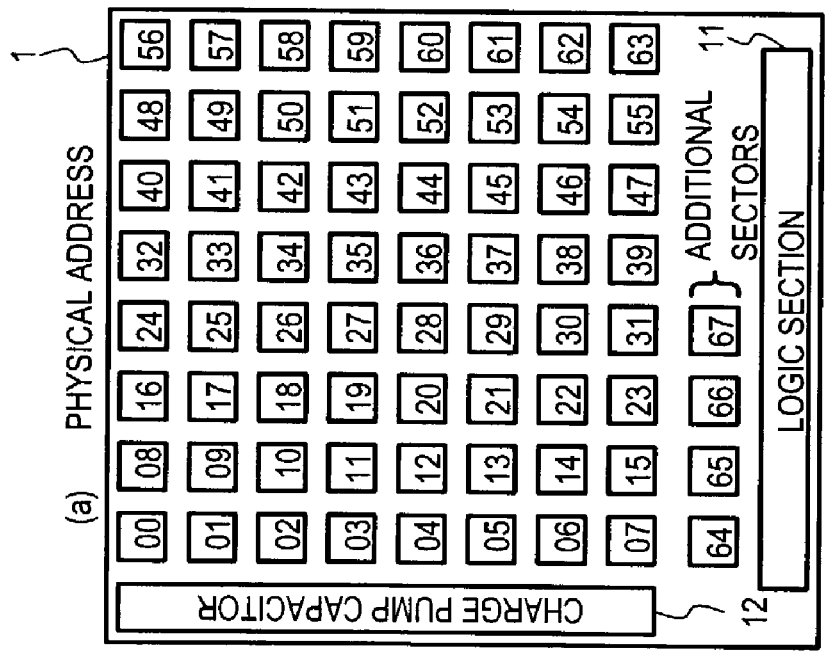
FIGS. 7(a) and 7(b) are diagrams illustrating a correspondence between a physical address and logical address of sectors according to an embodiment.
Figure 7:
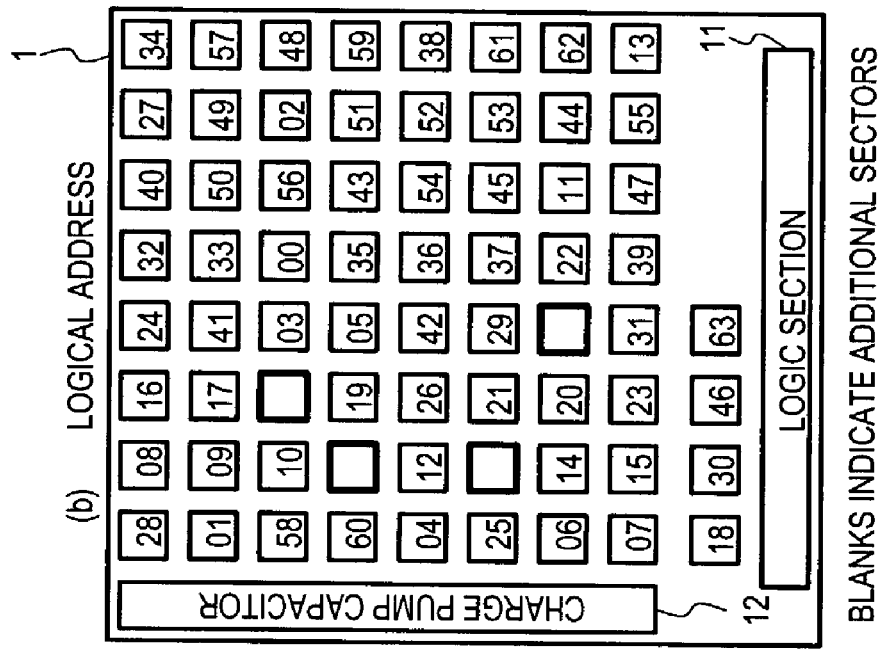

Referring now to FIG. 7, a diagram illustrating a correspondence between a physical address and logical address of sectors according to an embodiment is set forth.

FIG. 7(a) is a diagram showing a physical sector number (physical address) for each sector. The physical sector number may be equivalent to a physical sector address of each sector unit. As shown in FIG. 7(a), non-volatile storage device 1 may include a total of 68 sectors (00–67). Sectors (00–67) may include 64 sectors having physical sector numbers (00–63) and 4 "additional" sectors having physical sector numbers (64–67). They total physical address space of non-volatile storage device 1 may be 68 times the memory capacity of 1 sector.

A brief explanation of the physical address will now be given. When a sector of the non-volatile storage device 1, such as a flash memory, has 64K bytes (512 Kbits), the physical sector of, for example physical sector number 02 may be an address that is 64K added to the physical address of physical sector number 01. On the other hand, the logical sector number may correspond to a bit field of a portion of an access address provided by, for example, a controller or processor in a host system (not shown in FIG. 7) as an address signal or a command. The logical sector number may be designated by bits in an address field (for example, upper bits of an address) designating a sector in non-volatile storage device 1. An address of a memory cell or group of memory cells within the sector having the logical sector number may be designated by lower bits in the address field.

FIG. 7(b) is a diagram showing a logical sector number (logical address) assigned to each sector. In the example in FIG. 7(b), physical sector numbers (00, 01, 02, and 03) of FIG. 7(a) may correspond to logical sector numbers (28, 01, 58, and 60), for example. Additional physical sectors having physical sector numbers (64, 65, 66, and 67) may correspond to logical sector numbers (18, 30, 46, and 63), for example. In the example shown in FIG. 7(b), physical sector numbers (11, 13, 18, and 30) may be additional sectors. These additional sectors are not allotted logical sector numbers and are indicated by blanks in the diagrams. Note that, in the example shown in FIG. 7(b), the four sectors having physical sector numbers (64, 65, 66, and 67) that were indicated as additional physical sectors have been assigned logical sector numbers (18, 30, 46, and 63) and may thus be treated as logical sectors and not additional sectors.

Assume a physical sector (P) is assigned to a logical sector (L) and a physical sector (Q) is erased and unused. In accordance with the embodiment, when data in a sector having logical sector number (L) is updated, a sector having physical sector (P) assigned to a logical sector (L) may be erased, and data which is to be written into the sector having a logical sector number (L) may be written into a sector (physical sector number (Q)) from among additional sectors which have been erased and are still unused, and the logical sector number (L) may be assigned to the sector having the physical address number (Q). In this way, the apparent erase time for a sector may be reduced.

Figure 8:
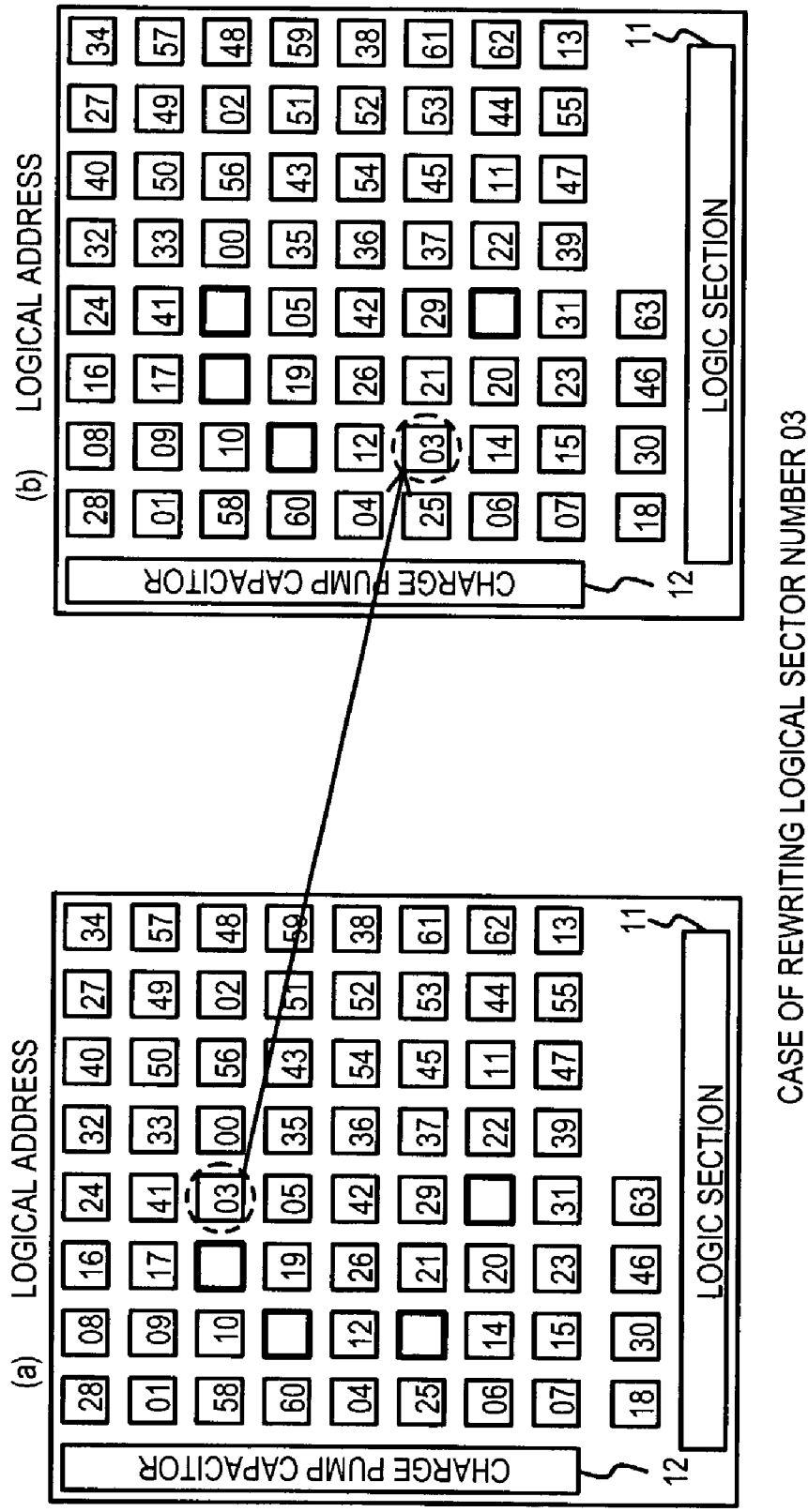
FIGS. 8(a) and 8(b) are diagrams illustrating the logical address of a sector changing before and after a rewriting step according to an embodiment.

FIG. 8 is a diagram illustrating the logical address of a sector changing before and after a rewriting step according to an embodiment.

Referring now to FIG. 8(a), when data of a logical sector number 03 (physical sector number 26) is rewritten, physical sector number 26 assigned to logical sector number 03 may be erased. However, by including additional sectors, an additional sector may be used to receive the written/rewritten data. In the example illustrated in FIG. 8, physical sector number 13 (immediately to the right of logical sector number 25) may be assigned as logical sector number 03. In this way, physical sector number 13 may have the data written into and may then be assigned to logical sector number 03 as illustrated in FIG. 8(b).

In accordance with the embodiment, by performing erasing of a sector while writing to an "additional" sector in parallel, the apparent erase time for a sector may be reduced. In this case, the apparent erase time for a sector may be reduced to 1/(number of additional sectors) of an actual sector erase time for a worst case in which consecutive erase/writes occur to more than the number of additional sectors. For a smaller number of consecutive erases/writes, an apparent erase time can be essentially zero.

Not that, the more times a flash memory is rewritten, the more likely defective sectors can occur. These defective sectors may be unusable.

According to an embodiment, when a bad/defective sector is generated, a usable/unusable flag may be turned on. A usable/unusable flag may be in a control data section within the sector and may manage erasing and rewriting. When a usable/unusable flag is turned on, the corresponding sector may not be used as an additional sector. By decreasing the number of additional sectors, generation of bad sectors due to repeated rewriting may be more likely.

Further, in accordance with the embodiments, when data of a sector (original sector) that is being used (i.e., to which a logical sector address has been assigned) is updated, data may be written into one of the additional sectors. The original sector may then become an additional sector (new additional sector) and a control may be performed to treat the original sector as empty. In this case, the physical address of the original sector may be registered in a table. Then in a subsequent data updating sequence, the new additional sector may be written with the updated data (re-writing), and may be assigned a logical sector address. A control may be executed to delete the physical address of the new additional sector from a table may be executed. A construction in accordance with the embodiments may equally distribute a frequency of sector usage among the plurality of sectors. In this way, writing/programming times may be minimized and the lifetime of a non-volatile storage device such as a flash memory may be increased.

Figure 1:
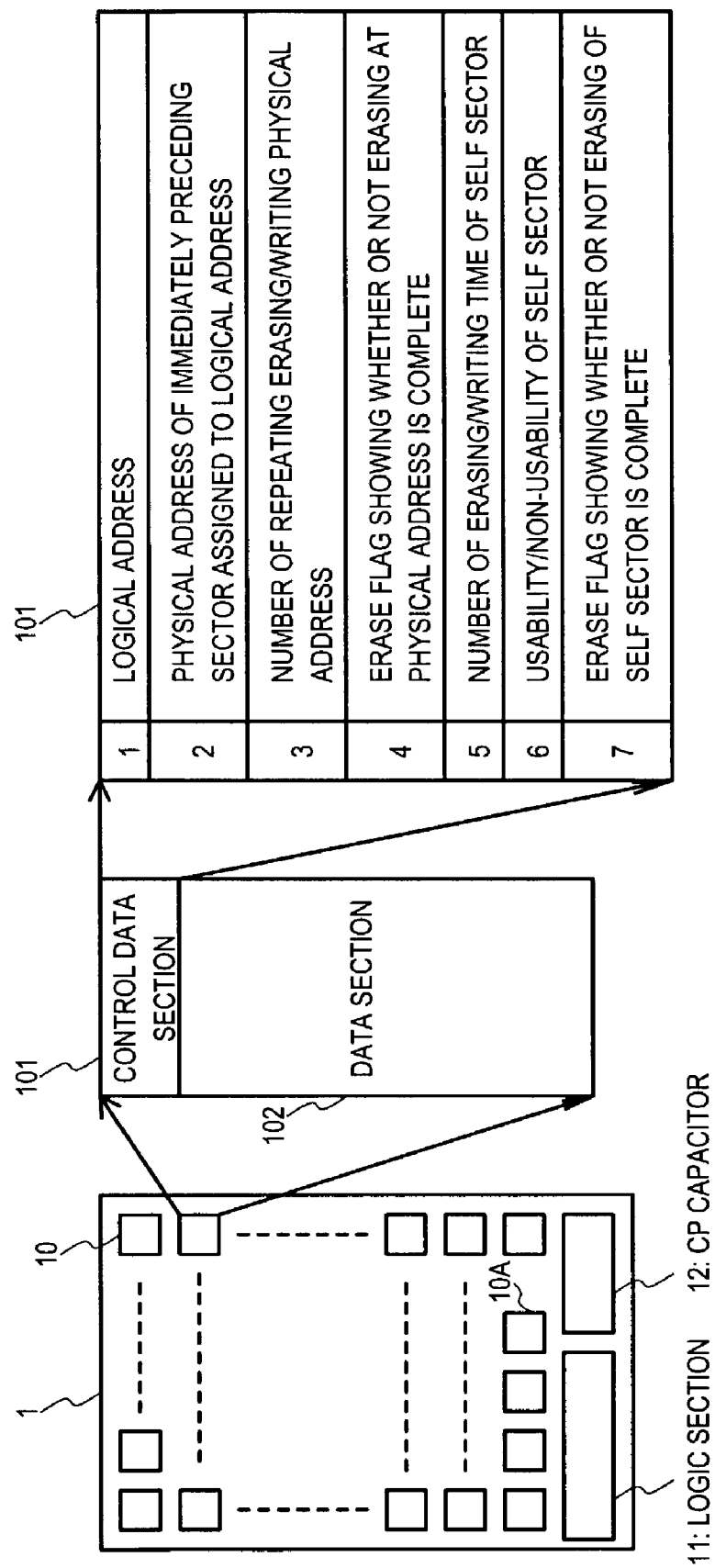
FIG. 1 is a diagram illustrating a non-volatile storage device according to an embodiment.

In accordance with the embodiments, each sector (for example, sector 10 in FIG. 1) may include a data section (for example, data section 102 in FIG. 1) and a control data section (for example, control data section 101 in FIG. 1). The data section may store data and the control section may store data to control the erasing/rewriting. The control data section may include a logical address (for example, item 1 in control data section 101 in FIG. 1), a physical address of address of the immediate preceding sector assigned to the logical address (for example, item 2 in control data section 101 in FIG. 1), and an erase flag (item 4 in FIG. 1). When data in a sector is to be rewritten, the logical address that is assigned to that sector (logical sector address) and a physical address of address of the immediate preceding sector assigned to the logical address may be written to the control data section. When the erasing of the sector that the logical sector address was assigned to is complete, the erase flag in the control data section may be set or turned on.

The control data section may also include control data indicating the number of write/erase times assigned to the physical sector address (for example, item 3 in control data section 101 of FIG. 1). When the data in a sector is rewritten, within the control data section, the logical address assigned to that sector (logical sector address), the physical address of an immediately preceding sector assigned to the logical address, and a number of write/erase times assigned to the physical sector address may be written to or updated in the control data section of the sector that is to be newly written to. When the erasing of the sector that the logical sector address was previously assigned to is complete, the erase flag in the control data section may be set or turned on. Further, an erase flag (for example, item 7 in control data section 101 of FIG. 1) in the control data section of the erased sector may be turned on or set. Additionally, in the erased sector, data indicating number of erase/write procedures (for example, item 5 in control data section 101 of FIG. 1) that have been executed in the erased sector may be updated or written.

Figure 2:
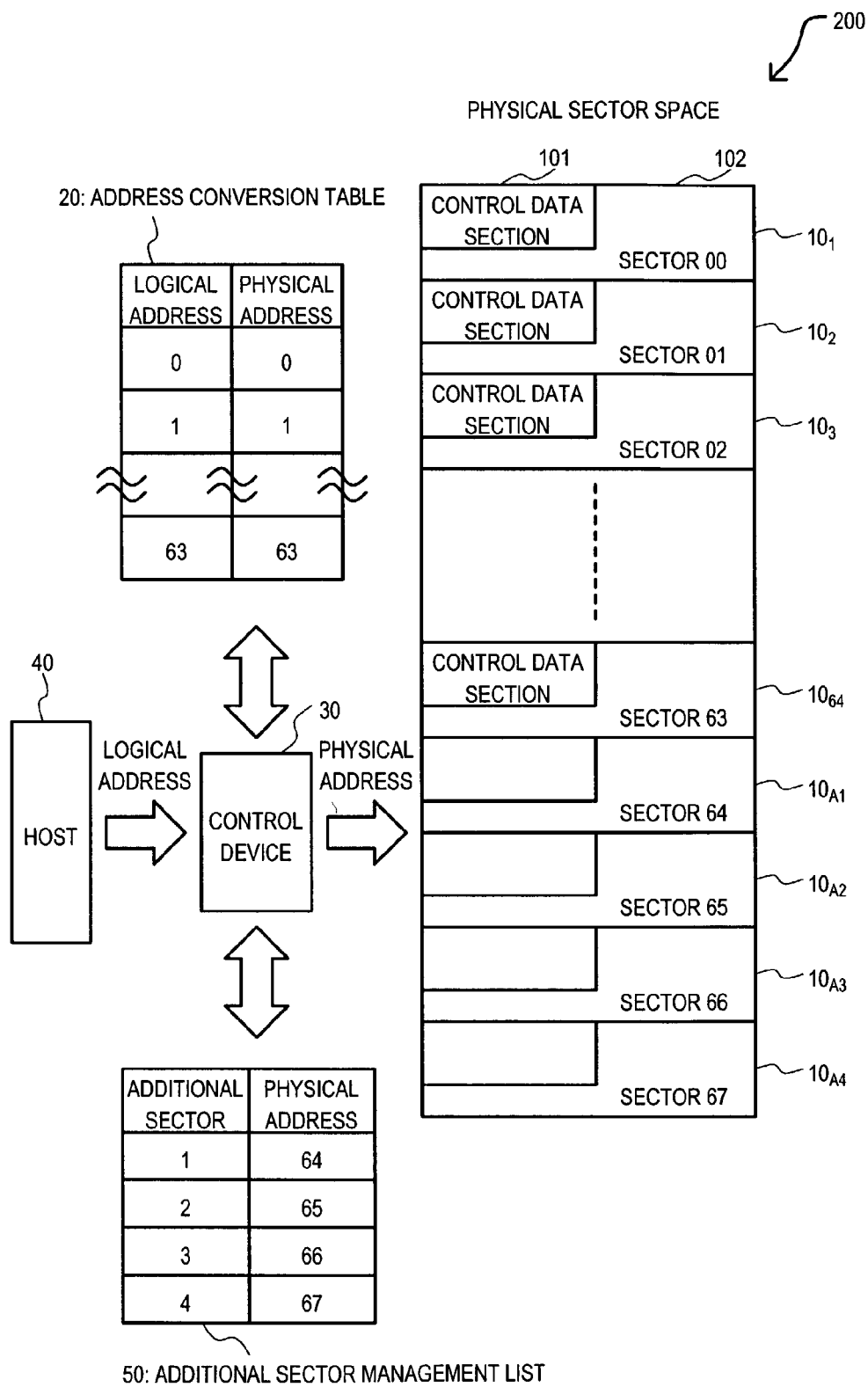
FIG. 2 is a diagram showing a configuration of a system in which a non-volatile storage device is applied according to an embodiment.
Figure 3:
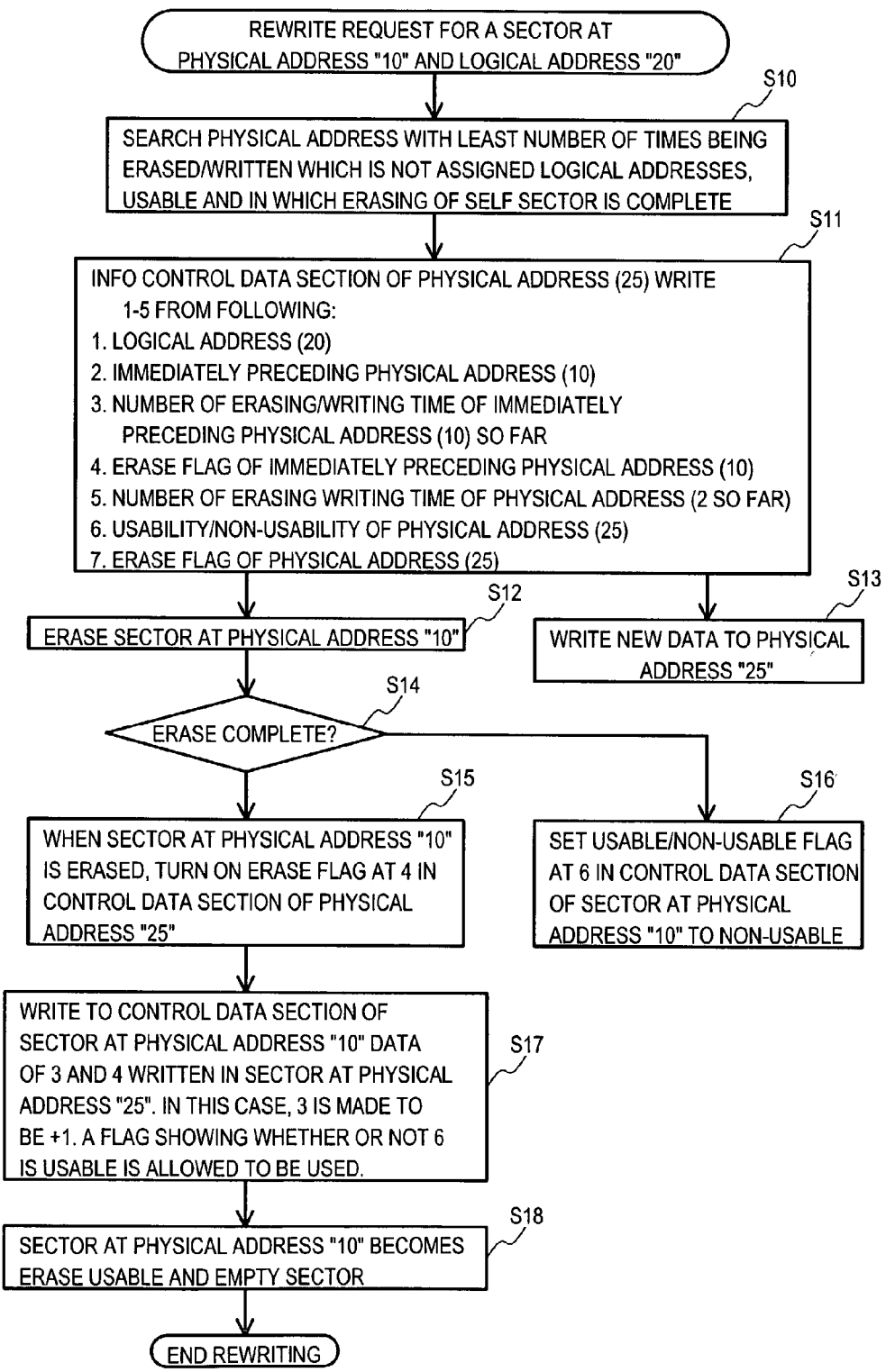
FIG. 3 is a flowchart illustrating an operation of an embodiment.

Power supply can be turned off or disrupted while one or some of the sectors are in the process of being erased (for example, step S12 in FIG. 3). When the power supply is turned on, the erase flag (for example, item 4 in control data section 101 of FIG. 1) of each sector may be read. Then, in the case where the erase flag is not turned on or set, erasing may be started for a sector at a physical address (for example, item 2 in control data section 101 of FIG. 1) indicated as the immediately preceding sector assigned to a logical address which has just been rewritten or updated. The above-mentioned control may be jointly performed in a logic section 11 of a non-volatile storage device such as a flash memory and in a memory control device (for example, control device 30 of FIG. 2) in response to, for example, a host (for example host 40 in FIG. 2) by means of firmware, software, or the like.

In accordance with the embodiments, the amount of time required for erasing may be decreased and the reliability of erasing/writing of a flash memory may be improved.

An explanation will now be made of operations/effects of the embodiments.

In accordance with the embodiments, the number of sectors (erasable units) may be set to be greater than a minimum number of sectors that are theoretically necessary in accordance with the logical address space (i.e., the physical address space may be larger than the logical address space). When a request is made to reprogram data (update or rewrite data) in a selected sector (indicated by a logical address), the sector may be erased and an additional sector (already erased sector) may be assigned to the logical address in which data may be written. At this time, a control data section in the additional sector that was assigned to the logical address may be updated. As a result, the amount of time required for erasing and updating a sector (logical address) may be accelerated. This may be done by reassigning a logical address to an additional sector that has already been erased, thus externally, it may appear that the erase time has been reduced or eliminated.

Also, in accordance with the embodiments, when a sector becomes marginal or defective due to repeated erasing/writing, this sector may not have a logical sector address assigned to it. Thus, the occurrence of problems due to repeated erasing/writing may be reduced.

In accordance with the embodiments, an address conversion table may be stored in a RAM (random access memory). The address conversion table may convert a logical address to a physical address. When the power supply is turned on, at a reset, initialization, or the like, the information in the control data section in each sector of the non-volatile memory (such as a flash memory) may be read and the mapping of a logical address to a physical address may be configured. Thus, even if address conversion information is lost due to, for example a power supply interruption, when the power supply turns back on, for example, the address conversion table may be easily regenerated. As a result, the reliability of the device may be improved.

A more detailed explanation of various embodiments of the present invention will now be described with reference to a number of drawings.

Referring now to FIG. 1, a diagram illustrating a non-volatile storage device according to an embodiment is set forth.

A non-volatile storage device 1 may include charge pump capacitor 12, a logic section 11 and a memory cell array section. Memory cell array section may be divided into sectors 10. Each sector 10 may include, for example, 64K-byte (kilobyte) memory cells. Charge pump capacitor 12 may serve as a booster circuit. Logic section 11 may control operations and addresses including physical/logical address mapping. Non-volatile storage device 1 may be a flash memory device in which erasing may be performed in units of a sector 10.

For example, in the case of a 32-Mbit (megabit) flash memory device, each device may be provided with 64 64-Kbyte sectors 10 (for example, see FIG. 10(b)). According to the embodiments, a plurality of sectors may be further provided as 65 Kbyte additional sectors 10A. In FIG. 10(b), four sectors (A00–A03) may be additional sectors 10A.

Referring once again to FIG. 1, each sector 10 may include a control data section 101 and a data section 102. Control data section 101 may store information/data for controlling erasing/rewriting. Data section 102 may store data, which may be used, for example by a processor or the like.

Control data section 101 provided in each sector may store address conversion information and information of the number of erase and rewrite times have been executed on a sector. Additionally, control data section 101 may store flags indicating an erase completion on a sector and a flag indicating usability/non-usability.

More specifically, as illustrated in FIG. 1, control data section 101 may include the following control data:
  Item 1, a logical address assigned to that sector 10 (logical sector address).
  Item 2, a physical address of an immediately preceding sector assigned to the logical address.
  Item 3, the number of write/erase times of the sector indicated by the physical address of item 2.
  Item 4, an erase flag showing whether or not erasing at the sector indicated by the physical address of item 2 is complete.
  Item 5, a number of write/erase times of the sector (self-sector) 10.
  Item 6, the usability/non-usability of the sector (self-sector) 10.
  Item 7, an erase flag showing whether or not erasing at the sector (self-sector) 10 is complete.

Referring now to FIG. 2, a diagram showing a configuration of a system in which a non-volatile storage device is applied according to an embodiment.

In the case of, for example a 32-Mbit flash memory devices, each device may be provided with 64 64-Kbyte sectors ($10_1$ to $10_{64}$) (physical sector numbers 0 to 63) and may be further provided with 4 64-Kbyte additional sectors ($10A_1$ to $10A_4$). In the example shown in FIG. 2, the 4 additional sectors ($10A_1$ to $10A_4$) may have physical sector numbers of 64 to 67, respectively.

An access address indicated in a command or an address signal from a central processing unit (CPU) or other such host 40 may be provided to a control device 30 as a logical address. Control device 30 may reference an address conversion table 20 to convert the logical address to a physical address. Address conversion table 20 may be stored in a RAM, or the like. In this way, access to a non-volatile storage device such as a flash memory may be performed. Address conversion table 20 may store values in a table format indicating a correspondence between logical addresses and physical addresses. On initialization caused by applying a power supply, or the like, correspondence between logical addresses (logical sector number) and physical addresses (physical sector number) may be stored. For example, 6 bits of an address signal may be used to indicate a logical address for accessing a sector because any of 64 sectors may be accessed. At the time of an initialization, for example, when a power supply is turned on or the like, a physical sector number of an additional sector may be stored in an additional sector management list 50. Additional sector management list 50 may be stored in a RAM, a register group, or the like. When a sector is rewritten, for example in an update or the like, the physical address of the sector that is erased may be provided as a new additional sector and registered in additional sector management list 50.

When, for example, a non-volatile storage device according to the embodiments is shipped out, it may be assumed that there is a one-to-one correspondence between the logical sector number 0 and the physical sector number 0, the logical sector number 1, and the physical sector number 1, etc, all the way to the logical sector number 63 and the physical sector number 63, as illustrated in address conversion table 20 of FIG. 2. Further, in additional sector management list 50, physical sector numbers (64 to 67) may respectively be registered as first through fourth additional sectors. Subsequently, for example, when logical sector number 0 is rewritten, physical sector number 0 may be erased and may become an additional sector (i.e., physical sector number 0 is registered in additional sector management list 50 as an additional sector), and the additional sector at physical sector number 64 may be assigned as logical sector number 0 (i.e., logical sector number 64 is erased from additional sector management list 50 and in address conversion table 20, the physical sector number corresponding to logical sector number 0 may become 64).

When the power supply is turned on, control device 30 may receive an instruction from host 40 and may read out a logical address in the control data section of each sector ($10_1$ to $10_{64}$ and $10_{A1}$ to $10_{A4}$). Control device 30 may then prepare the contents of address conversion table 20 using physical addresses of the sectors. Control device 30 may set a physical address (physical address number) of additional sectors into additional sector management list 60. At this time, control device 30 may register, as an additional sector in additional sector management list 50, the physical sector number of a sector for which an erase flag (item 7 in control data section 101 in FIG. 1) indicates erasure has been completed and for which a useable/non-usable flag (item 6 in control data section 101 in FIG. 1) indicates usability. This additional sector may be selected from among the sectors which have not been assigned a logical address. Then, when sector rewriting changes the correspondence between the logical address and physical address of a sector, host 40 and control device 30 may perform a control operation whereby content of address conversion table 20 and additional sector management list 50 may be updated. Additionally in the above-mentioned control operation, the content of control data section 101 of the sector that was subject to the rewriting may be updated.

Referring now to FIG. 3, a flowchart illustrating an operation of an embodiment is set forth.

With reference to the flowchart of FIG. 3, an explanation will be made of a case of processing a request to rewrite a logical sector number "20". At this point, it is assumed logical sector number "20" is assigned to physical sector number "10".

First at step S10, a search may be made of physical sector addresses of sectors (additional sectors) not assigned to a logical sector number (i.e., is still unused) and is usable and erased. At this time, the sector among the additional sectors that has been erased/written the least number of times may be selected. In the present example, the sector having a physical sector number "25" is selected. Then, the physical sector number "25" may be erased from the additional sector management list 50 (FIG. 2).

Next at step S11, information in control data section 101 (FIG. 1) of physical sector number "25" may be written. A logical address number "20" may be written into item 1 as a logical address. A physical address number "10" may be written into item 2 as a physical address of an immediately preceding sector assigned to the logical address. Item 3 may be written with the number of times physical address number "10" has been erased (in accordance with item 5 in control data section 101 of physical address number "10". Erase flag (item 4) may be set in accordance with item 7 in control data section 101 of physical address number "10".

Next, at steps (S12 and S13), respectively, the sector having a physical sector number "10" may be erased and updated data may be written into the sector having a physical sector number "25". Steps (S12 and S13) may be performed concurrently.

At step S14, an erase verify may be performed to determine if physical sector number "10" has been properly erased.

If it has been determined that physical sector number "10" has been properly erased, step 15 may be executed. In step S15, an erase flag (item 4 in control data section 101) of physical sector number "25" may be turned on or set.

If it has been determined that physical sector number "10" cannot be properly erased, step 16 may be executed. In step S16, a usable/non-usable flag (item 6 in control data section 101) of physical sector number "10" may be set as non-usable. Hereafter, physical sector number "10" may be treated as a bad or defective sector and may not be used.

Next at step S17, when the erase of physical sector number "10" is completed and verified, the number of times physical sector number "10" has been erased may be incremented by +1. This value may be written into item 3 in control data section 101 of physical sector number "25" and into item 5 in control data section 101 of physical sector number "10". Also at step S17, a usable/non-usable flag (item 6 in control data section 101) of physical sector number "10" may be set to indicate the usability of physical sector number "10". When erase has been verified to be complete, a usable/non-usable flag (item 6 in control data section 101) of physical sector number "10" may be set to usable.

Next at step S18, physical sector number "10" has been determined to be erased and usable as a new additional sector. Physical sector number "10" may then be added into additional sector management list 50 (FIG. 2) as a new additional sector.

Figure 12:
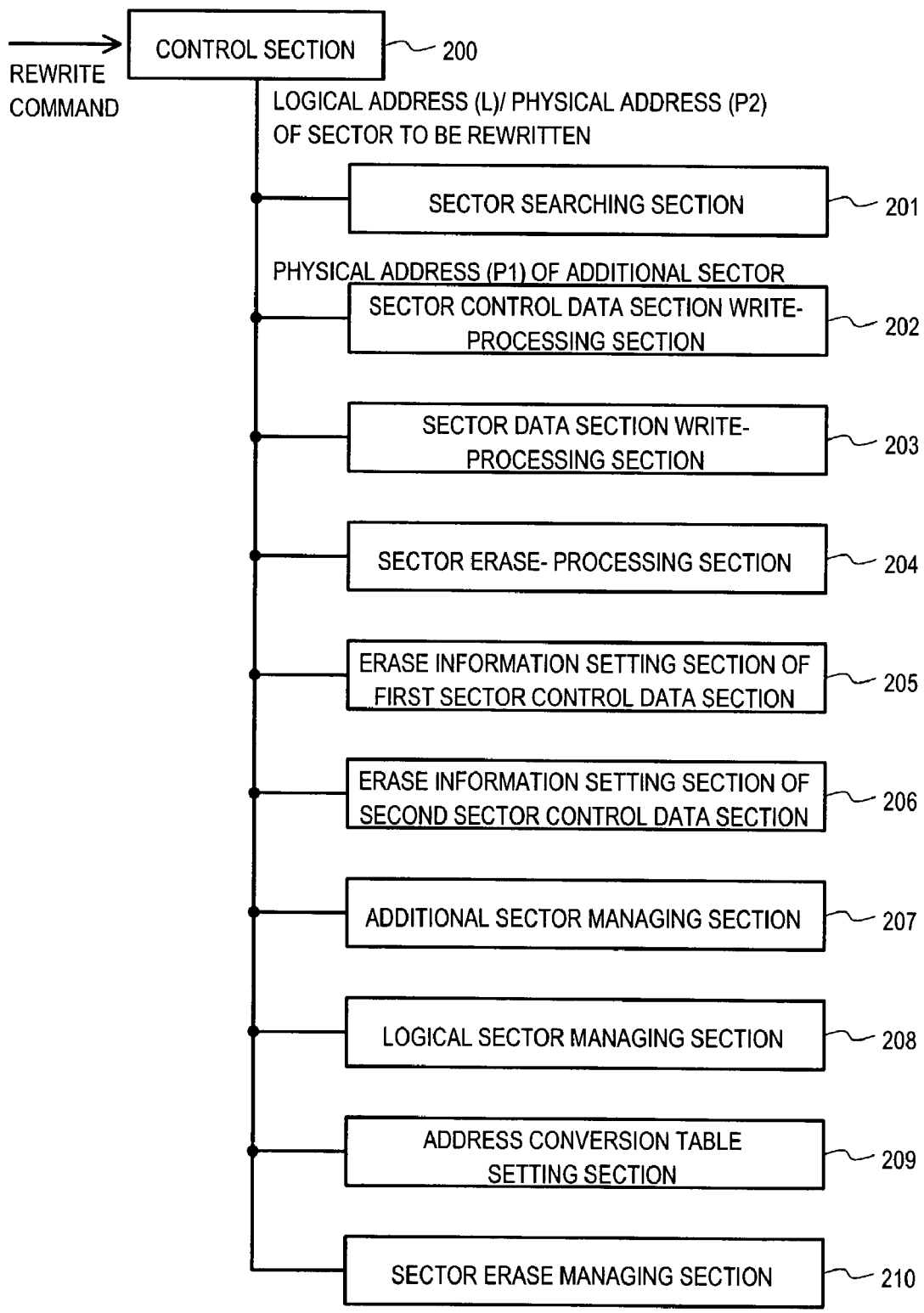
FIG. 12 is a block schematic diagram illustrating a construction of a control device according to an embodiment.
Figure 13:
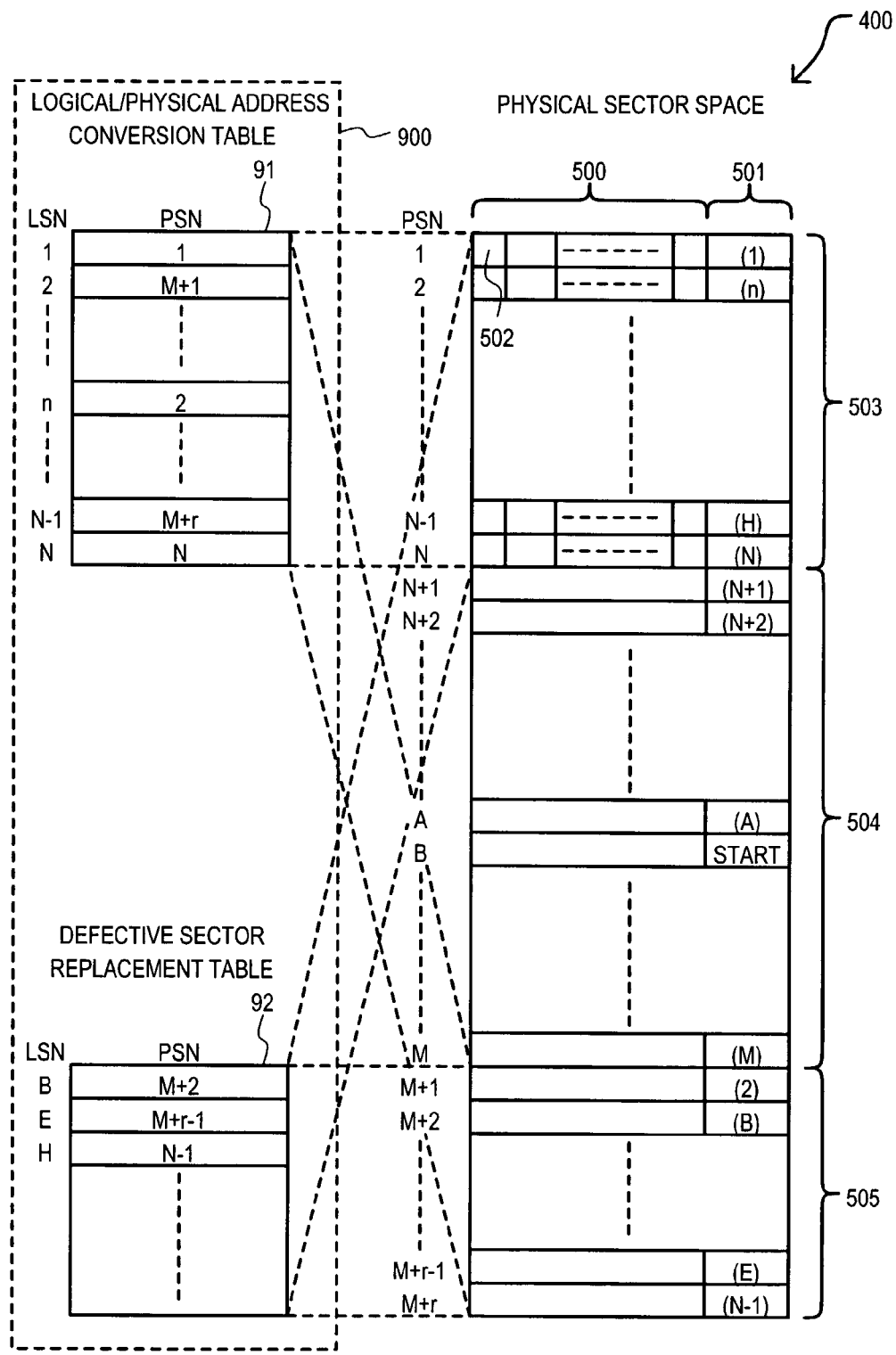
FIG. 13 is a diagram of the configuration of a conventional flash disk card.

Referring now to FIG. 12, a block schematic diagram illustrating a construction of a control device according to an embodiment is set forth and given the general reference character 1200. Control device 1200 may be used as a control device 30 in FIG. 2 and may perform the control functions illustrated in FIG. 2.

Control device 1200 may include a sector searching section 201, a sector control data section write-processing section 202, a sector data section write-processing section 203, a sector erase-processing section 204, first and second sector control data section erase-information setting sections (205 and 206), an additional sector managing section 207, a logical sector managing section 208, an address conversion setting section 209, a sector erase-status managing section 210, and a control section 200. Control section may perform overall control of control device 1200.

Control section 200 may receive a command from a host (for example, host 40 in FIG. 2). In the following example, it is assumed that a logical sector address (logical address) L corresponds with a physical sector address P2. When control section receives a rewrite request (command) to reprogram the data in a sector corresponding to logical sector address L, sector searching section 201 may search among sectors that are not assigned logical sector addresses (for example, sectors having their physical sector addresses registered in additional sector management list 50 in FIG. 2 and are being managed as "additional sectors"). In this way, a sector that is usable (i.e., has an erasable/non-erasable flag at item 6 in control data section 101 indicating usable) and is already erased (erase flag at item 7 in control data section 101 is on or set) may be selected or retrieved.

When a sector (for example, physical sector address P1) is identified or found by sector searching section 201, sector control data section write-processing section 202 may read out sector information from items 5, 7, or the like in control data section 101 of the sector at physical sector address P2 corresponding to logical sector address L. Sector control data section write-processing section 202 may then write into items (1 through 4) of control data section of the sector at physical sector address P1, respectively, logical sector address L, physical sector address P2, a number of erasing/writing times so far in the history of the sector at physical sector address P2, and an erase flag indicating whether or not the erasing of the sector at physical sector address P2 is complete.

Sector data section write-processing section 203 may write the new/updated data into data section 102 (FIG. 1) of the sector at physical sector address P1. The new/updated data may be the data to be used to update the data that was stored at physical sector address P2. A configuration may also be possible in which control device 1200 (such as control device 30 in FIG. 2) may be provided with a buffer memory (not illustrated). A buffer memory may temporarily store the sector data and the data to be updated. In this way, data held in the buffer memory may be written to the data section of the sector at physical sector address P1.

After sector control data section write-processing section 202 has written the number of erasing/writing times of physical sector address P2 and the completion or non-completion of the erasing and/or other necessary information into control data section 101 (FIG. 2) of the "additional sector" at physical sector address P1, sector erase-processing section 204 may completely erase the sector at physical sector address P2.

The erasing of the sector at physical sector address P2 by sector erase-processing section 204, and the writing of new/updated data to the sector at physical sector address P1 by sector data write-processing sector 203 may be performed in parallel. However, the erasing of a sector may take longer than writing of data into a sector.

When the erasing of the sector at physical sector address P2 by sector erase-processing section 204 is complete, first sector control data section erase-information setting section 205 may set an erase flag (item 4) in control data section 101 (FIG. 1) at the physical sector address P1 to a value indicating erasing is complete. Also, at this time, first sector control data section erase-information setting section 205 may set an erase flag (item 7) in control data section 101 (FIG. 1) at the physical sector address P2 to a value indicating erasing is complete. The completion of erasing may be determined by an erase verify operation.

Second sector control data section erase-information setting section 206 may write into the control data section 101 (FIG. 1) at item 5 of the sector at erased physical sector address P2, a value equal to the current value incremented by +1. This may indicate the updated number of erasing/writing times of the sector at physical sector address P2. Also, at this time, second sector control data section erase-information setting section 206 may write this value into the control data section 101 (FIG. 1) at item 3 of the sector at physical sector address P1.

Second sector control data section erase-information setting section 206 may also set an usable/non-usable flag indicating the usability of physical sector address P2 into the control data section 101 (FIG. 1) at item 6 of the sector at erased physical sector address P2. In a case where, as a result of erasing by sector erase-processing section 204, the sector at physical sector address P2 was unable to be properly erased, second sector control data section erase-information setting section 206 may set the usable/non-usable flag into control data section 101 (FIG. 1) at item 6 of the sector at erased physical sector address P2 indicating non-usable.

Additional sector managing section 207 may manage additional sector management list 50 (FIG. 2). When the erasing of the sector at physical sector address P2 by sector erase-processing section 204 is complete, additional sector managing section 207 may register the physical sector address P2 in additional sector management list 50. In this way, the sector at physical sector address P2 may be listed as an erased and usable new additional sector to which a logical sector address is not currently assigned. Further, once the additional sector (in this case physical sector address P1) has been retrieved by sector searching section 201, additional sector managing section 207 may delete this physical sector address (P1, in this case) from the additional sector management list 50 (FIG. 2).

In address conversion table 20 (FIG. 2), logical sector managing section 208 may update or register with the physical sector address P1 of the sector that the data was written to. In this way, physical sector address P1 may be assigned to logical sector address L. Thereafter, when logical sector address L is indicated, host 40 (FIG. 2) may access physical sector address P1.

At a time when, for example, the system power supply is turned on, address conversion table setting section 209 may read the control data section 101 (FIG. 1) of the sectors that have been assigned logical sector addresses. In this way, address conversion table 20 (FIG. 2) may be configured with physical sector addresses being assigned to a corresponding logical sector address. Further, at a time when, for example, the system power supply is turned on, among sectors which have not been assigned a logical sector address, the additional sector management section 207 may register those sectors which are erased and usable as additional sectors into additional sector management list 50. Additional sector management list 207 may be stored on a RAM, registers, or the like.

In the case where a power supply is interrupted, or the like, while sector erase-processing section 204 was erasing a sector, when the power supply is turned back on, sector erase-status managing section 210 may perform erasing on that sector. Note that, the functions of elements (200 to 210) shown in FIG. 12 may be dispersed across control device 30 (FIG. 2) and logic section 11 (FIG. 1) of a non-volatile storage device 1, such as a flash memory chip, or the like.

Figure 4:
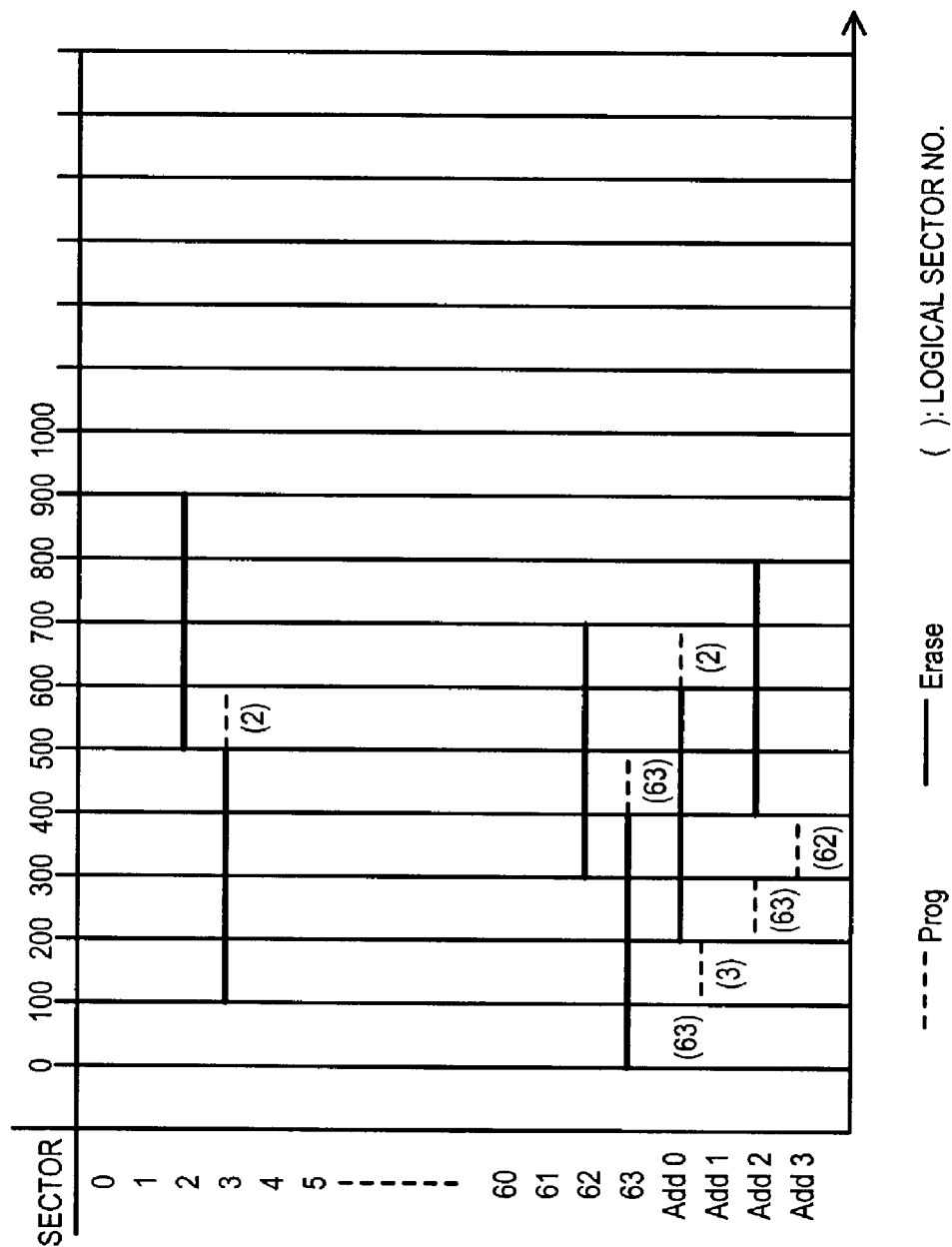
FIG. 4 is a timing diagram illustrating sector rewriting operations according to an embodiment.

FIG. 4 is a timing diagram illustrating sector rewriting operations according to an embodiment. In FIG. 4, the vertical axis correspond to physical sector numbers (0 to 63) and the $1^{st}$ through $4^{th}$ additional sectors at physical sector numbers (Add0 to Add3). The horizontal axis correspond to time in milliseconds (ms). A broken line at a sector indicates a writing (Prog) period and a solid line indicates an erasing (Erase) period.

FIG. 5 is a diagram illustrating various activities performed on and logical sector number mapped to physical sector numbers according to an embodiment. The diagram of FIG. 5 may illustrate processes of the embodiment when erase/write requests are provided in the same sequence as FIG. 11 (illustrating a conventional approach). Note that initially, additional sectors have not been assigned logical sector numbers (0 to 63). In FIG. 5, in order to simply the explanation, $1^{st}$ through $4^{th}$ additional sectors are indicated by numbers Add1, Add2, Add3, and Add4.

Figure 6:
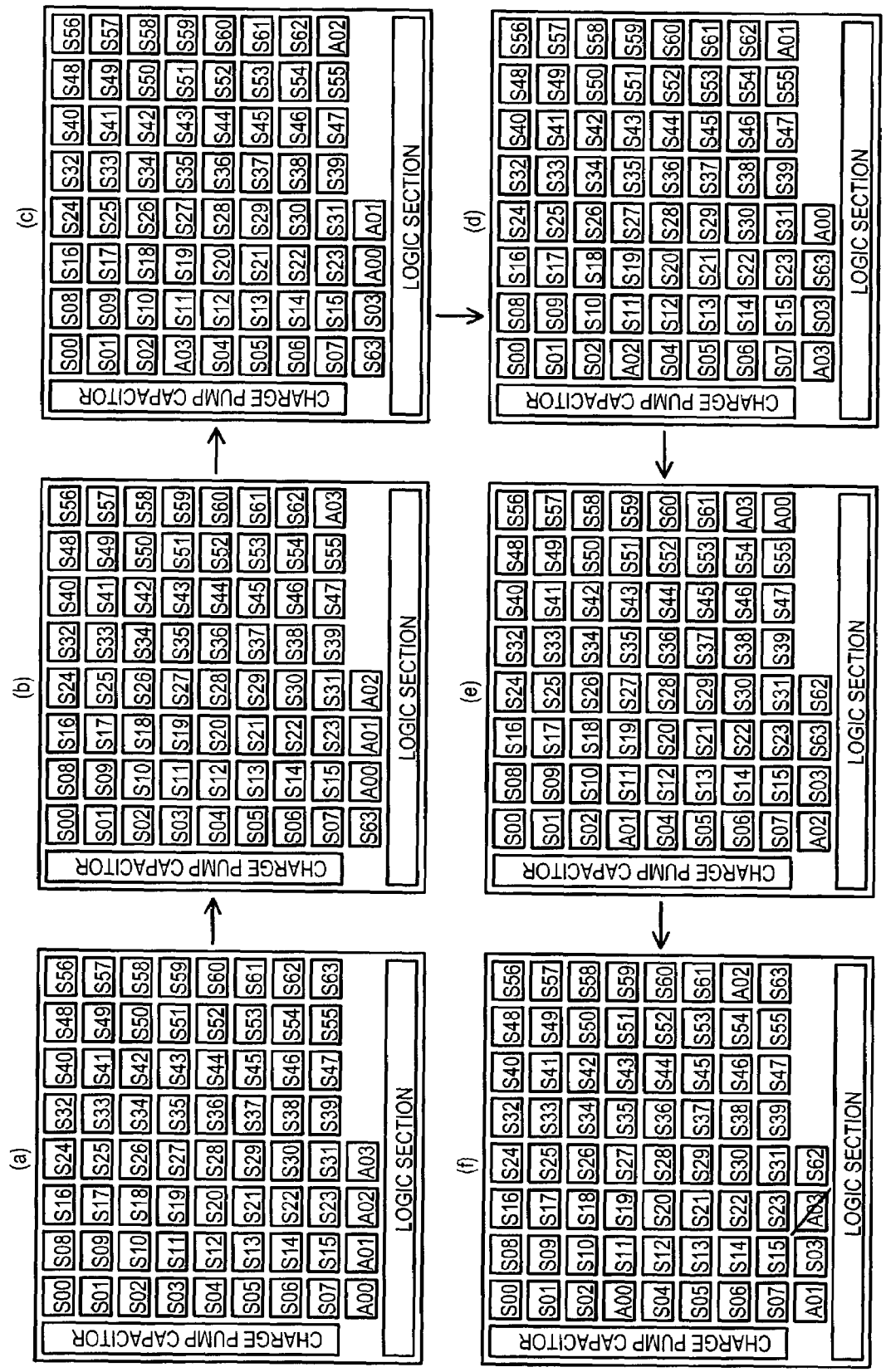
FIGS. 6(a)–(f) are plan diagrams showing the erase/writing operations shown in FIG. 5 according to an embodiment.

FIG. 6 is a plan diagram showing the erase/writing operations shown in FIG. 5 according to an embodiment. In FIG. 6 sectors are illustrated with logical sector numbers. FIG. 6(a) to FIG. 6(f), may, respectively, correspond to erase/writing steps 1 to 6 in FIG. 5.

An explanation will now be made of, for example, sector rewriting operations in accordance with the embodiments with reference to FIGS. 4, 5, and 6. In the beginning when usage starts on non-volatile storage device 1, the logical sector number and physical sector number may match each other. It is assumed here that the amount of time to erase a sector is about 40 ms, and the number of additional sectors is 4 sectors. It is also assumed that all of sectors (0 to 63) are being used. At this time, physical sector numbers 64, 65, 66, and 67 of the 4 additional sectors may already be registered in additional sector management list 50 (FIG. 2). Note, the management of the 4 additional sectors may be performed by additional sector managing section 207 (FIG. 12) of memory control device 30 (FIG. 2) or by logic section 11 (FIG. 1) of non-volatile storage device 1, or the like.

First all 64 sectors at physical sector numbers (0 to 63), also corresponding to logical sector numbers (0 to 63) may have data written therein and are thus being used.

In the case where a rewrite (update data) request (command) to reprogram data in a sector at logical (and physical) sector number 63 is received, physical sector number 63 may be erased. Essentially simultaneously, the updated data may be written into the $1^{st}$ additional sector (physical sector number 64) as illustrated in erase/write 1 step in FIG. 5. Then, the logical sector number for the sector at physical sector number 64 may become "63" (see FIG. 6(b)). During the time of writing the updated data to physical sector number 64, a logical address may not yet be registered for physical sector number 64 in address conversion table 20 (FIG. 2). Thus, the $1^{st}$ additional sector may be invisible to the host 40 (FIG. 2) side. The selection of the $1^{st}$ additional sector (physical sector number 64) and the writing of the updated data into $1^{st}$ additional sector (physical sector number 64) may be performed by additional sector searching section 201 (FIG. 12) and sector data section writing section 203 (FIG. 12) of control device 30 (FIG. 2) which received a reprogram command. Alternatively, a configuration may also be used in which logic section 11 (FIG. 1) of flash memory performs these steps.

As shown in FIG. 5, the sector at the erased physical sector number 63 may then be changed to the $4^{th}$ additional sector (additional sector number Add4) after erasure. This may also be illustrated as additional sector A03 in FIG. 6(b).

Additional sector numbers (65, 66, and 67) may become $1^{st}$ through $3^{rd}$ additional sectors (Add1, Add2, and Add3 in FIG. 5; A00, A01, and A02 in FIG. 6(b)). Note, the numbers Add1, Add2, Add3, and Add in FIG. 5 and A00 to A03 in FIG. 6, indicating $1^{st}$ through $4^{th}$ additional sectors, may not be logical addresses visible on the host side. Rather, these designators are used to schematically illustrate additional sectors. Management of the migration (assignment) of the sector at erased physical sector number 63 to the $4^{th}$ additional sector (additional sector number Add4) may also be performed by additional sector management section 207 (FIG. 12) of control device 30 (FIG. 2) that received the sector reprogram command. This function of additional sector managing section 207 (FIG. 12) may also be implemented in logic section 11 (FIG. 11) of a non-volatile storage device, such as a flash memory, or the like. Additional sector managing section 207 (FIG. 12) of control device 30 (FIG. 2) may update (register) the $1^{st}$ through $4^{th}$ additional sectors (Add1 to Addd4) in additional sector management list 50 (FIG. 2) over to physical sector numbers (65, 66, 67, and 63), respectively.

In FIG. 5, at erase/write step 2, an erase/write command may be received for logical sector number 3. In this case, physical sector number 3 may be erased and, essentially simultaneously, new/updated data may be written to $1^{st}$ additional sector (physical sector number 65). Thus, the additional sector at physical sector number 65 may be assigned logical sector number 3. Upon erasure, physical sector number 3 may then be assigned to the $4^{th}$ additional sector (Add4) (A03 in FIG. 6(c)). The sectors at physical sector numbers 66 and 67 may, respectively, become $1^{st}$ and $2^{nd}$ additional sectors (Add1 and Add2) and the sector at physical sector number 63 may become the $3^{rd}$ additional sector (Add3). The location of $1^{st}$ through $4^{th}$ additional sectors may be illustrated as additional sectors (A00 to A03) in FIG. 6(c). This operation may be sequentially repeated.

Next, at erase/write step 3, a erase/write command may be received for logical sector number 63. In this case, physical sector number 64 may be erased and, essentially simultaneously, new/updated data may be written to $1^{st}$ additional sector (physical sector number 66). Thus, the additional sector at physical sector number 66 may be assigned logical sector number 63. The sectors at physical sector numbers 67, 63, 3, and 64 may, respectively, become $1^{st}$ through $4^{th}$ additional sectors (Add1 to Add4). The location of $1^{st}$ through $4^{th}$ additional sectors may be illustrated as additional sectors (A00 to A03) in FIG. 6(d).

Next, at erase/write step 4, a erase/write command may be received for logical sector number 62. In this case, physical sector number 62 may be erased and, essentially simultaneously, new/updated data may be written to $1^{st}$ additional sector (physical sector number 67). Thus, the additional sector at physical sector number 67 may be assigned logical sector number 62. The sectors at physical sector numbers 63, 3, 64, and 62 may, respectively, become $1^{st}$ through $4^{th}$ additional sectors (Add1 to Add4). The location of $1^{st}$ through $4^{th}$ additional sectors may be illustrated as additional sectors (A00 to A03) in FIG. 6(e).

As illustrated in FIG. 4, a plurality of sectors may be erased essentially in parallel at one time. Assuming the erase time for physical sector number 63 is at 0 to 400 ms, the erase time for physical sector number 3 may be at 100 to 500 ms, the erase time for physical sector number 64 may be at 200 to 600 ms, and the erase time for physical sector number 62 may be at 300 to 700 ms. Note that four sectors may be being erased at times 600 to 700 ms. Also note that, the numbers inside parentheses ( ) in FIG. 4 are logical sector numbers assigned to the physical sector numbers (vertical axis) as corresponding to the assignments made at the time of erase/write steps illustrated in FIG. 5.

Figure 9:
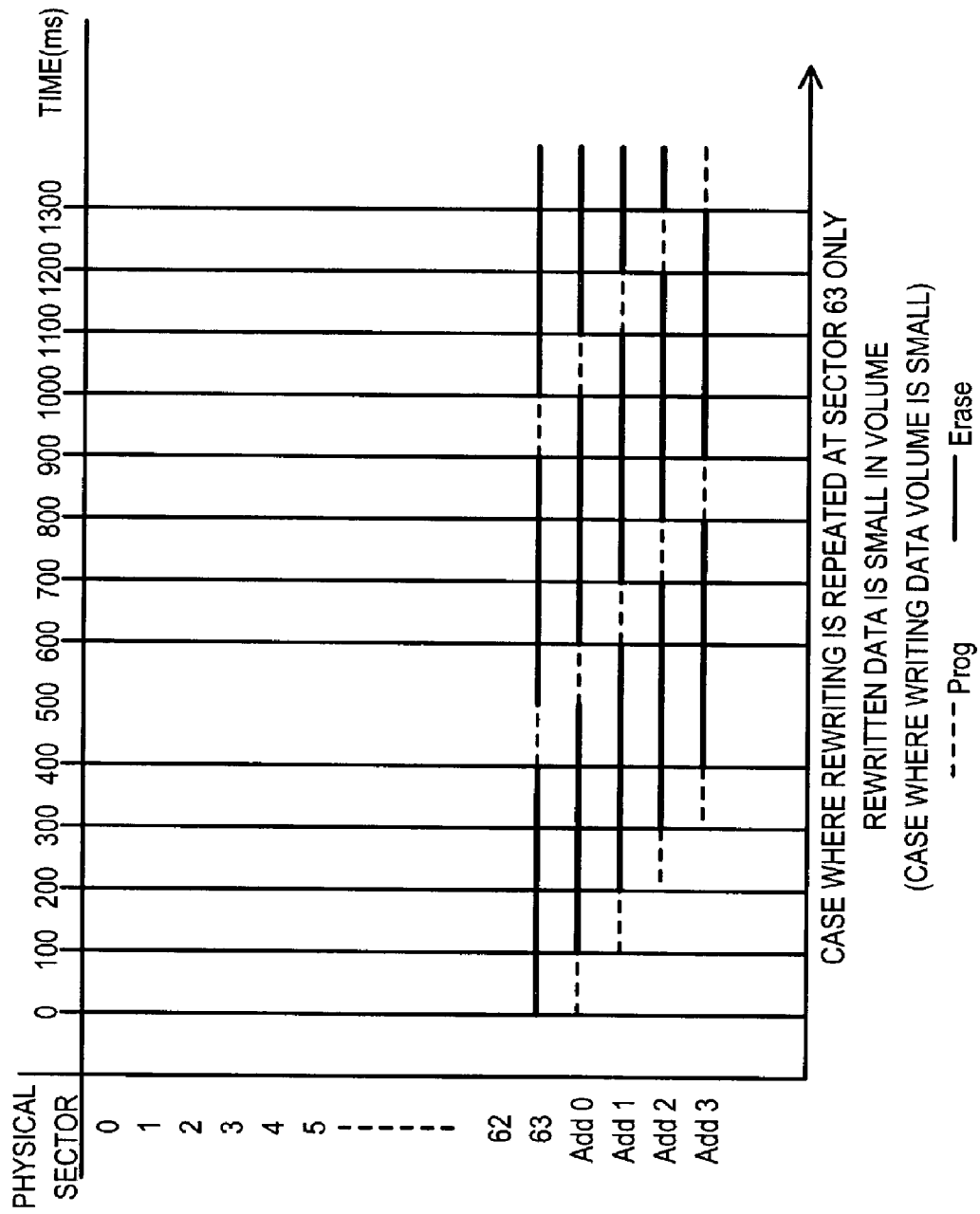
FIG. 9 is a timing diagram illustrating an example of an operation of an embodiment.

Referring now to FIG. 9, a timing diagram illustrating an example of an operation of an embodiment is set forth.

In the example shown in FIG. 9, consecutive erase/write steps on a logical sector number are illustrated. In this case, a logical sector number which is initially assigned to physical sector number 63 is updated in consecutive erase/rewrite steps. In a first erase/write step (at time 0), physical sector number 63 may be erased while physical sector number Add0 may be assigned to the logical sector number and may have updated data written into. At time 100 ms, the logical sector number may be updated again in an erase/write step. Thus, at time 100 ms, physical sector number Add0 may be erased while physical sector number Add1 may be assigned to the logical sector number and may have updated data written into. At time 200 ms, the logical sector number may be updated again in an erase/write step. Thus, at time 200 ms, physical sector number Add1 may be erased while physical sector number Add2 may be assigned to the logical sector number and may have updated data written into. At time 300 ms, the logical sector number may be updated again in an erase/write step. Thus, at time 300 ms, physical sector number Add2 may be erased while physical sector number Add3 may be assigned to the logical sector number and may have updated data written into. At time 400 ms, the logical sector number may be updated again in an erase/write step. Thus, at time 400 ms, physical sector number Add4 may be erased. At this time, physical sector number 63 has finished the erasure that began at time 0. Thus, physical sector number 63 may be assigned to the logical sector number and may have updated data written into.

As noted above, erasing and rewriting may be performed in parallel. In this way, five consecutive or sequential erase/write operations to the same logical sector number may be executed and may be completed in about 800 ms. By comparison, in a conventional case in which the same logical sector number (thus, same physical sector number) receives five sequential erase/write operations, the required time would be the sum of erase time (400 ms)+write time (100 ms) multiplied 5 times, totaling about 2,500 ms. As such, in accordance with the embodiments the erase/write time may be reduced to less than ⅓ of a conventional case.

As illustrated in FIG. 4, FIG. 9, etc, erasing (indicated by a solid line) may be performed on a plurality of physical sectors in parallel. Therefore, assuming an apparent erase time require per one sector is T, the actual erase time required per one sector is t, and the number of additional sectors is M, then, in the case where the number of sectors that can be erased in parallel is equal to or more than M, the fastest speed that the erase time may be reduced to is:

$$T=t/M.$$

In other words, in the embodiments where there are 4 additional sectors and the number of sectors that can be erased in parallel is 4 or greater, the apparent erase time (to the user/controller, or the like) for one sector may be reduced down to 400/4=100 ms. This can be seen by referring to FIG. 9, in which a case where four consecutive erase/write commands are executed to the same logical sector number. As illustrated in FIG. 9, data may be updated in the same logical sector four times in 400 ms, eight times in 800 ms, and 12 times in 1,200 ms.

In non-volatile storage device 1, such as a flash memory, or the like, it is assumed that charge pump capacitor 12 may have a capacity sufficient to simultaneously erase 4 or more sectors (which is the electrical power required to independently erase 4 sectors in parallel). It is also assumed that logic section 11 may perform controls that may select the sectors that are being erased in parallel and the sectors that are being written to.

The conversion of the logical sector number to the physical sector number may be performed by using address conversion table 20. The content of address conversion table 20 may be configured using information stored in control data sections 101 of sectors in non-volatile storage device 1, such as a flash memory, or the like.

In accordance with an embodiment of the present invention, when data is rewritten, the data may be written into an additional sector. A logical sector number may be assigned to the additional sector and the physical sector previously assigned the logical sector number may be erased and turned into an additional sector (i.e. a sector not assigned a logical sector number/address). As such, by sequentially changing the correspondences between physical sector numbers and logical sector number, it may be possible to reduce or avoid concentrated repetition of writing/erasing at a specific sector.

Next, explanation will be made of a case where a problem has occurred in a sector due to repeated writing/erasing, in accordance with an embodiment of the present invention.

Referring once again to FIG. 5, at erase/write step 5, a erase/write command may be received for logical sector number 63. In this case, physical sector number 66 may be erased and, essentially simultaneously, new/updated data may be written to $1^{st}$ additional sector (physical sector number 63). However, if physical sector number 66 cannot be properly erased (an erasing failure has occurred) at erase/write step 5, then the sector at physical sector number 66 (A03 in FIG. 6(f)) may be prohibited from use thereafter. In control data section 101 (FIG. 1) of physical sector number 66, a usability/non-usability flag (item 6) may be set to non-usable. In accordance with this embodiment, physical sector number 66 (the sector set to non-usable) may be stored and managed in a defective sector table (not shown). The defective sector table may be provided in control device 30 (FIG. 2), logic section 11 (FIG. 11) of non-volatile storage device 1, or the like.

As described above, when a bad sector occurs, the number of additional sectors may be decreased. If the number of additional sectors decreases, there may be no change in the number of logical sector numbers.

At erase/write step 6 in FIG. 5, there may only be three additional sectors Add1, Add2, and Add3 (A00–A02) in FIG. 6(f). After that, there may still be three additional sectors at erase/write steps 7 and 8.

Next, an explanation will be made of the number of additional sectors according to an embodiment. The number of additional sectors may be determined when the non-volatile storage device, such as a flash memory, is designed. The number may be determined based on a desired apparent erase time (apparent erase time to a user, such as a controller or the like), and a defect occurrence rate required for product reliability. Further, the number of additional sectors may be relative to the number of logical sectors.

Further, in wafer testing and other such selection processes, all sectors of the non-volatile storage device may be checked to determine good and defective sectors. However, in the case where a plurality of additional sectors are provided in this embodiment, additional sectors may be assigned logical sector numbers and thus, replacing defective sectors. Thus, overall yield of the product may increase and manufacturing costs may decrease.

A sector's number of erase/write repetitions, which may be stored in control data section 101 (FIG. 1) of the sector, may be obtained when the new data is going to be written. Then, the logical addresses being managed as additional sectors may be used one after the other in order of least number of write/erase repetitions. This may allow write/erase repetitions to be distributed, so that a particular sector may not have an undue amount of write erase repetitions compared to other sectors.

In the embodiments, a greater number of physical sectors may be provided than the number of logical sectors. As such, by designing the logic section such that a plurality of chips jointly use the additional sectors, the apparent erase time may be reduced and reliability may be improved not only in a single non-volatile storage device, but also for a plurality of essentially identically structured chips. These chips may be mounted in, for example, a multi-chip module.

Also, a single non-volatile storage device may include a plurality of flash memory arrays, each having a plurality of sections including additional sections.

Note, in accordance with the embodiments, in the rewriting sequence shown in FIG. 5 and the like, the power supply may be kept in the on state until the erasing of the sector that is to be erased last is complete. However, if the power supply is interrupted or turned off, the sectors that are in the process of being erased may be erased in a follow up fashion when the power supply is subsequently turned on. When this happens, a determination may be made as to which sectors are in the process of being erased when the power supply is turned on. This determination may be done by accessing the physical address of immediately preceding physical sector numbers (item 2 of control data section 101 (FIG. 1)) and corresponding erase flags (item 4 of control data section 101 (FIG. 1)) indicating whether or not erasing has been completed. If the erase cycle is in the process of being executed, erasing at the sector corresponding to the physical sector number in which erasing has not been completed. When the power supply is turned on, erase-status managing section 201 (FIG. 12) may detect the sector that was being erased when the power supply was interrupted and may execute control to restart the erasing.

As shown in FIG. 4, in accordance with an embodiment, the number of sectors erased in parallel may increase. Therefore, it may be necessary to provide a charge pump capacitor 12 (FIG. 1) having sufficient power to handle the number of sectors which may be erased in parallel, the number of sectors which may be written to, and the like.

In accordance with the embodiments, more sectors may be physically provided than the number of sectors that are theoretically necessary. Each sector may include address conversion information, number of reprogram times, an erase flag and other information. Further, bad sectors may not be used. Accordingly, write/erase repetitions may be distributed and may not be concentrated on a specific physical cell or sector.

Explanation will be made of representative operations/effects of embodiments.

In a first operation/effect, the apparent erase speed per sector may be about 1/(number of additional sectors) relative to erase time of a sector in a conventional approach.

In a second operation/effect, the lifetime for write/erase repetitions may, at maximum, be multiplied by the number of additional sectors. At minimum, the lifetime may be the number of logical sectors/numbers of physical sectors.

In a third operation/effect, the rate of chip problems/defects due to writing/erasing may be decreased. In the case of a conventional configuration (where the number of logical sectors equals the number of physical sectors) shown in FIG. 10(a), a chip including M sectors may be discarded if only one sector in the chip is defective. In contrast to this, according to the embodiments, a chip with M logical sectors may have N additional sectors. In this case, a chip may only be discarded if (N+1) sectors are defective. That is, in accordance with the embodiments, among M+N sectors, a chip may still be functional and sellable if up to N sectors are simultaneously defective or go bad due to repeated erase/write operations. Also, the chips failure or wear-out rate may decrease significantly compared to the conventional configuration.

As described above, the present invention may reduce an apparent sector erase time and may significantly reduce a bad sector rate. As such, the embodiments may be suited for application in a flash memory card, or the like, where data rewriting is performed.

Note that, in the embodiments, the functions of control device 30 (FIG. 2), which may perform controls of accessing the address conversion table and a flash memory on a non-volatile storage device, may also be integrated within the non-volatile storage device.

In accordance with the embodiments, when additional sectors are registered into additional sector management list 50 (FIG. 2), the additional sectors may be registered into additional sector management list 50 in an order of priority such that a sector with the least number of erasing/rewriting repetitions may be assigned as the 1$^{st}$ additional sector. In this case, when an additional sector is to be written to, sector searching section 201 (FIG. 12) may retrieve the 1$^{st}$ additional sector from among additional sectors and the additional sector having the least number of erasing/writing times may be selected without performing processing necessary to compare the number of erasing/rewriting times.

It is understood that the embodiments described above are exemplary and the present invention should not be limited to those embodiments. Specific structures should not be limited to the described embodiments.

Thus, while the various particular embodiments set forth herein have been described in detail, the present invention could be subject to various changes, substitutions, and alterations without departing from the spirit and scope of the invention. Accordingly, the present invention is intended to be limited only as defined by the appended claims.

What is claimed is:

1. A non-volatile storage device, comprising:
a plurality of sectors divided into logical sectors and a plurality of additional sectors, each sector being erasable as a unit, each sector being identified with an individual physical sector address and each logical sector being identified with an individual logical sector address, each sector also including a data storing section and a control data storing section and the logical sector address for each logical sector is stored in the control data storing section, each sector further being associated with a usability flag indicating whether or not the sector is usable and an erase flag indicating whether or not erasure of the sector has been completed;
a logic section that writes data into a first one of the plurality of additional sectors and erases the first one of the logical sectors when data stored in the first one of the logical sectors is updated, and changes the first one of the plurality of additional sectors to the first one of the logical sectors and changes the first one of the logical sectors that is erased into one of the plurality of additional sectors;
an address conversion section that provides the individual physical sector address in response to receiving the individual logical sector address, the address conversion section including a random access mommy storing an address conversion table; and
in response to a power up initialization, a control section provides the individual physical sector address of each of the plurality of additional sectors for which an erase flag indicates erasure has been completed and a usability flag indicates the sector is usable, the individual physical sector addresses provided by the control section to be used in an additional sector management list.

2. The non-volatile storage device according to claim 1, wherein:
the logic section writes updated data into the first one of the plurality of additional sectors while the first one of the logical sectors is being erased.

3. The non-volatile storage device according to claim 1, further including:
a control section that reads the logical sector address in the control data storage section of each logical sector in response to a power up initialization.

4. The non-volatile storage device according to claim 1, further including:
each of the plurality of additional sectors associated with an erase value indicating a number of times the additional sector has been erased; and
the logic section selects the first one of the plurality of additional sectors according to the erase value having a lowest value among the plurality of additional sectors.

5. The non-volatile storage device according to claim 4, wherein:
each sector includes a data storing section and a control data storing section and the erase value for each sector is stored in the control data storing section.

6. The non-volatile storage device according to claim 1, wherein each sector includes a data storing section and a control data storing section, the non-volatile storage device includes:
the logic section that writes an individual logical sector address and a physical sector address of the first one of the logical sectors being erased into the control data storing section of the first one of the plurality of additional sectors.

7. A non-volatile storage device, comprising:
a nonvolatile memory section including a plurality of sectors divided into logical sectors and a plurality of additional sectors, each sector being associated with an individual physical sector address and each logical sector being identifiable as a logical sector by being assigned an individual logical sector address;
each sector includes a data storage section and a control data storage section, the control data storage section storing the assigned individual logical sector address of the sector and a first erase value and including a usability flag indicating whether or not the sector is usable and an erase flag indicating whether or not erasure of the sector has been completed;

a logic section that, when updating data stored in a logical sector identified with a first individual logical address, writes updated data into a first one of the plurality of additional sectors and erases the logical sector identified with the first individual logical address, and identifies the first one of the plurality of additional sectors with the first individual logical address and changes the logical sector that is erased to one of the plurality of additional sectors; wherein the first erase value indicating the number of erasures of the sector previously assigned to the individual logical sector address; and in response to a power up initialization, a control section provides the individual physical sector address of each of the plurality of additional sectors for which an erase flag indicates erasure has been completed and a usability flag indicates the sector is usable, the individual physical sector addresses provided by the control section to be used in an additional sector management list.

8. The non-volatile storage device according to claim 7, wherein:

the control data storage section of each logical sector stores the individual physical address of the sector that was previously assigned to the individual logical sector address currently assigned to the logical sector.

9. The non-volatile storage device according to claim 8, wherein:

the control data storage section of each logical sector stores a first erase flag indicating whether the sector having the individual physical address that was previously assigned to the individual logical sector address currently assigned to the logical sector has been erased.

10. The non-volatile storage device according to claim 7, wherein:

the control data storage section of each sector stores an erase value indicating the number of erasures of the sector itself.

11. The non-volatile storage device according to claim 10, wherein:

the control data storage section of each sector stores a usability flag indicating the usability of the sector itself.

12. The non-volatile storage device according to claim 10, wherein:

the control data storage section of each sector stores an erase flag indicating whether or not the sector itself has been erased.

13. The non-volatile storage device according to claim 7, further including:

an address conversion section providing the individual physical sector address in response to receiving the individual logical sector address.

14. The non-volatile storage device according to claim 7, wherein:

the nonvolatile memory section is formed on the same device as the logic section.

15. A rewrite control method for a non-volatile storage device, comprising the steps of:

erasing as a unit a sector assigned to a first logical sector address, when data in the sector assigned to the first logical sector address is to be updated;

writing updated data into a first one of a plurality of additional sectors while the sector assigned to the first logical sector address is being erased;

assigning the first logical sector address to the first one of the plurality of additional sectors to convert the first one of the plurality of additional sectors to one of a plurality of logical sectors;

storing at least a portion of an address conversion table in a random access memory;

managing the erased sector as a new one of the plurality of additional sectors;

setting an erase flag in a control data storage section of the erased sector to indicate an erased state; and in response to a power up initialization, providing an individual physical sector address of each of the plurality of additional sectors for which the erase flag indicates erasure has been completed and a usability flag indicates the sector is usable, the individual physical sector addresses provided by the control section to be used in an additional sector management list.

16. The rewrite control method according to claim 15 wherein:

writing the updated data includes selecting the first one of the plurality of additional sectors based on a least number of erase times.

17. The rewrite control method according to claim 15, wherein:

each sector includes a data storing section and a control storing section, and writing update data into the first one of the plurality of additional sectors includes writing to the control data storage section of the first one of the plurality of additional sectors the assigned individual logical sector address, an individual physical sector address of the sector previously assigned the individual logical sector address, an erase flag that indicates whether or not the erasure of the sector previously assigned the individual logical sector address has been completed, and an erase value that indicates the number of times the sector previously assigned the individual logical sector address has been erased.

18. The rewrite control method according to claim 15, wherein:

each sector includes a data storing section and a control storing section; and writing update data into the first one of the plurality of additional sectors includes writing to the control data storage section of the first one of the plurality of additional sectors an erase flag that indicates whether or not the erasure of the sector has been completed; and an erase value that indicates the number of times the sector has been erased.

19. The rewrite control method according to claim 15, further including the steps of:

generating an individual physical sector address in response to an individual logical sector address; and updating the address conversion table to assign the first logical sector address to the individual physical sector address corresponding to the first one of the plurality of additional sectors.

20. The rewrite control method according to claim 19, further including:

updating the address conversion table in response to a power up initialization.

21. The rewrite control method according to claim 15, further including the step of:

setting a usability flag of the sector assigned to the first logical sector address to an unusable indication if erasing the sector assigned to the first logical sector address fails.

22. The rewrite control method according to claim 15, wherein:
writing the updated data into the first one of the plurality of additional sectors includes
writing the first logical sector address into a control data storage section of the first one of the plurality of additional sectors; and
writing the physical sector address of the sector being erased that is assigned to the first logical sector address into the control data storage section of the first one of the plurality of additional sectors.

23. The rewrite control method according to claim 22, wherein:
writing the updated data into the first one of the plurality of additional sectors includes
writing an erase value indicating how many times the sector assigned to the first logical sector address has been erased into the control data storage section of the first one of the plurality of additional sectors.

24. The rewrite control method according to claim 15, further including the step of:
updating an erase value in a control data storage section of the erased sector to indicate the number of times the erased sector has been erased.

* * * * *